US010399221B2

(12) United States Patent
Kobayashi et al.

(10) Patent No.: US 10,399,221 B2
(45) Date of Patent: Sep. 3, 2019

(54) ROBOT AND ROBOT SYSTEM

(71) Applicant: Seiko Epson Corporation, Tokyo (JP)

(72) Inventors: Masakazu Kobayashi, Shiojiri (JP);
Tsuguya Kojima, Chino (JP); Masaki Miyasaka, Chino (JP)

(73) Assignee: Seiko Epson Corporation (JP)

( * ) Notice: Subject to any disclaimer, the term of this patent is extended or adjusted under 35 U.S.C. 154(b) by 284 days.

(21) Appl. No.: 15/357,057

(22) Filed: Nov. 21, 2016

(65) Prior Publication Data

US 2017/0151666 A1 Jun. 1, 2017

(30) Foreign Application Priority Data

Nov. 26, 2015 (JP) ................................. 2015-231047

(51) Int. Cl.
*G05B 15/00* (2006.01)
*G05B 19/00* (2006.01)
*B25J 9/16* (2006.01)

(52) U.S. Cl.
CPC ........... *B25J 9/1633* (2013.01); *B25J 9/1687* (2013.01); *G05B 2219/40031* (2013.01); *G05B 2219/40032* (2013.01); *Y10S 901/09* (2013.01)

(58) Field of Classification Search
CPC .................. B25J 9/1633; B25J 9/1687; G05B 2219/40031; G05B 2219/40032; Y10S 901/09
See application file for complete search history.

(56) References Cited

U.S. PATENT DOCUMENTS

| 4,745,681 A | * | 5/1988 | Hollis, Jr. | ............. B23P 19/105 29/739 |
| 4,964,211 A | * | 10/1990 | Arao | ....................... B23P 19/00 29/705 |
| 9,138,893 B2 | | 9/2015 | Nagai et al. | |
| 2005/0113971 A1 | | 5/2005 | Zhang et al. | |
| 2015/0105907 A1 | * | 4/2015 | Aiso | ...................... B25J 9/1697 700/259 |
| 2016/0052135 A1 | * | 2/2016 | Motoyoshi | ............. B25J 9/1687 29/281.6 |

FOREIGN PATENT DOCUMENTS

| EP | 1 052 072 A1 | 11/2000 |
| JP | 2004-119285 A | 4/2004 |
| JP | 2012-232384 A | 11/2012 |
| JP | 2014-166681 A | 9/2014 |

OTHER PUBLICATIONS

Extended European Search Report for Application No. EP 16 20 0441 dated Apr. 10, 2017 (7 pages).

* cited by examiner

*Primary Examiner* — Harry Y Oh
(74) *Attorney, Agent, or Firm* — Harness, Dickey & Pierce, P.L.C.

(57) ABSTRACT

A robot includes an arm, and a force detector provided in the arm and detecting a force, wherein at least one of a first object and a second object is moved in a direction in which the first object and the second object are closer to each other by the arm, and, if contact of the first object with a position different from an insertion portion of the second object is determined based on output of the force detector, the first object and the second object are separated.

3 Claims, 24 Drawing Sheets

| STANDARD | MALE SIDE TOP VIEW | MALE SIDE FRONT VIEW | FEMALE SIDE FRONT VIEW | NECESSARY INSERTION PRESSURE [N] | GRASPING PRESSURE [N] |
|---|---|---|---|---|---|
| USB-A TYPE | | | | 10-15 | 10.3 |
| HDMI | | | | 40-45 | 14 |

FIG.22

ROBOT AND ROBOT SYSTEM

BACKGROUND

1. Technical Field

The present invention relates to a robot and a robot system.

2. Related Art

Research and development of robots for fitting of two objects are carried out.

In this regard, a robot that performs a fitting work as a predetermined work of fitting a first work in a second work by three actions of a contact action of bringing the first work into contact with the second work, an exploration action of exploring the shape of the second work with the first work, and an insertion action of inserting the first work into the second work is known (see Patent Document 1 (JP-A-2014-166681)).

However, in the robot, the first work is moved and the shape of the second work is explored while the first work remains in contact with the second work, and thereby, one or both of the first work and the second work may be deformed.

SUMMARY

An aspect of the invention is directed to a robot including an arm, and a force detector provided in the arm and detecting a force, wherein at least one of a first object and a second object is moved in a direction in which the first object and the second object are closer to each other by the arm, and, if contact of the first object with a position different from an insertion portion of the second object is determined based on output of the force detector, the first object and the second object are separated.

According to this configuration, the robot moves at least one of the first object and the second object in the direction in which the first object and the second object are closer to each other by the arm, and, if determining that the first object has come into contact with a position different from the insertion portion of the second object based on the output of the force detector, separates the first object and the second object. Thereby, the robot may suppress deformation of the first object and the second object when the first object comes into contact with a position different from the insertion portion of the second object.

Another aspect of the invention may adopt a configuration in which, in the robot, if the contact of the first object with the position is determined, at least one of the first object and the second object is moved in another direction than an opposite direction to the direction in which the objects are closer to each other of directions in which the first object and the second object are farther from each other, and the first object and the second object are separated.

According to this configuration, if determining that the first object has come into contact with a position different from the insertion portion of the second object, the robot moves at least one of the first object and the second object in another direction than the opposite direction to the direction in which the first object and the second object are closer to each other of the directions in which the first object and the second object are farther from each other, and separates the first object and the second object. Thereby, the robot may start to move at least one of the first object and the second object from a different position from the previous position in which the object had been started to move in the direction in which the first object and the second object are closer to each other.

Another aspect of the invention may adopt a configuration in which, in the robot, if the contact of the first object with the position is determined, a trajectory of movement from the position is set to a straight line, at least one of the first object and the second object is moved in another direction than an opposite direction to the direction in which the objects are closer to each other of directions in which the first object and the second object are farther from each other, and the first object and the second object are separated.

According to this configuration, if determining that the first object has come into contact with a position different from the insertion portion of the second object, the robot separates the first object and the second object by setting the trajectory of the movement from the position different from the insertion portion of the second object to a straight line and moving at least one of the first object and the second object in another direction than the opposite direction to the direction in which the first object and the second object are closer to each other of the directions in which the first object and the second object are farther from each other. Thereby, the robot may shorten the period taken for moving at least one of the first object and the second object to a position to start moving the object in the direction in which the first object and the second object are closer to each other again after separating the first object and the second object.

Another aspect of the invention may adopt a configuration in which, in the robot, when the contact of the first object with a position different from the insertion portion of the second object and the separation of the first object and the second object are performed at twice or more, at least one of the first object and the second object is helically moved as seen in the direction in which the objects are closer to each other.

According to this configuration, when performing the contact of the first object with a position different from the insertion portion of the second object and the separation of the first object and the second object at twice or more, the robot helically moves at least one of the first object and the second object as seen in the direction in which the first object and the second object are closer to each other. Thereby, the robot may seek a position in which the first object can be inserted into the insertion portion of the second object while helically changing the relative position between the first object and the insertion portion of the second object to start moving the object in the direction in which the first object and the second object are closer to each other.

Another aspect of the invention may adopt a configuration in which, in the robot, the first object is an electronic component.

According to this configuration, the robot moves at least one of the electronic component and the second object in a direction in which the electronic component and the second object are closer to each other by the arm, and, if determining that the electronic component has come into contact with a position different from the insertion portion of the second object based on the output of the force detector, separates the electronic component and the second object. Thereby, the robot may suppress deformation of the electronic component and the second object when the electronic component comes into contact with a position different from the insertion portion of the second object.

Another aspect of the invention may adopt a configuration in which, in the robot, a reference position as a position of reference is taught, and at least one of the first object and the second object is moved in the direction in which the objects may be closer to each other.

According to this configuration, the robot moves at least one of the first object and the second object in the direction in which the first object and the second object are closer to each other by teaching the reference position as a position of reference. Thereby, the robot may move at least one of the first object and the second object in the direction in which the first object and the second object are closer to each other by teaching the reference position.

Another aspect of the invention is directed to a robot system including the robot described above and a robot control apparatus that controls the robot.

According to this configuration, the robot system moves at least one of the first object and the second object in a direction in which the first object and the second object are closer to each other by the arm, and, if determining that the first object has come into contact with a position different from the insertion portion of the second object based on the output of the force detector, separates the first object and the second object. Thereby, the robot system may suppress deformation of the first object and the second object when the first object comes into contact with a position different from the insertion portion of the second object.

As described above, the robot and the robot system move at least one of the first object and the second object in a direction in which the first object and the second object are closer to each other by the arm, and, if determining that the first object has come into contact with a position different from the insertion portion of the second object based on the output of the force detector, separate the first object and the second object. Thereby, the robot and the robot system may suppress deformation of the first object and the second object when the first object comes into contact with a position different from the insertion portion of the second object.

BRIEF DESCRIPTION OF THE DRAWINGS

The invention will be described with reference to the accompanying drawings, wherein like numbers reference like elements.

FIG. 22 shows specific examples of standards of a connector PL1 and a connector PL2.

DESCRIPTION OF EXEMPLARY EMBODIMENTS

First Embodiment

As below, the first embodiment of the invention will be explained with reference to the drawings.

Configuration of Robot System

First, a configuration of the robot system 1 is explained.

Figure 1:
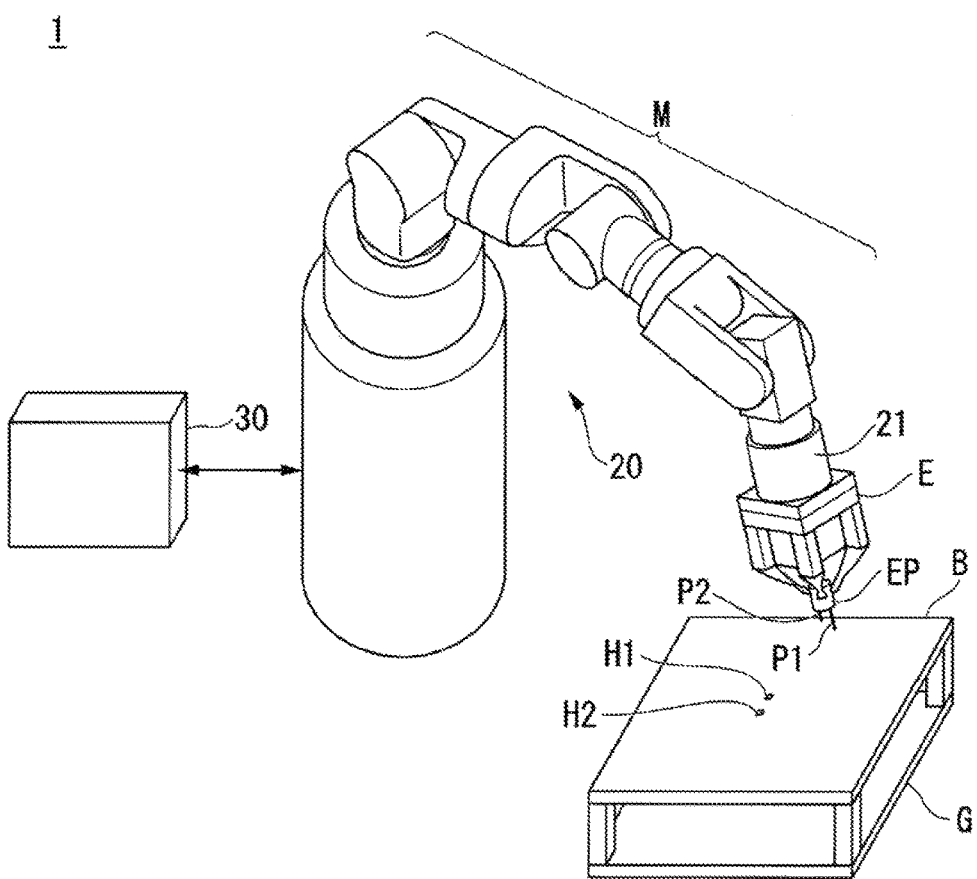
FIG. 1 shows an example of a configuration of a robot system 1 according to the first embodiment.

FIG. 1 shows an example of the configuration of the robot system 1 according to the first embodiment. The robot system 1 includes a robot 20 and a robot control apparatus 30.

The robot 20 is a single-arm robot including an arm and a support that supports the arm.

The single-arm robot is a robot having a single arm in the example. Note that the robot 20 may be a multi-arm robot in place of the single-arm robot. The multi-arm robot is a robot having two or more arms. Of the multi-arm robots, a robot having two arms is also called a dual-arm robot. That is, the robot 20 may be a dual-arm robot having two arms or a multi-arm robots having three or more arms.

The arm includes an end effector E, a manipulator M, and a force detection unit 21.

The end effector E is an end effector having a finger part that can grasp an object in the example. Note that the end effector E may be another end effector that can lift an object using a magnet, a jig, or the like in place of the end effector having the finger part.

The end effector E is communicably connected to the robot control apparatus 30 by a cable. Thereby, the end effector E performs actions according to control signals acquired from the robot control apparatus 30. Wired communications via the cable are performed according to standards of e.g. Ethernet (registered trademark), USB (Universal Serial Bus), or the like. Or, the end effector E may be adapted to be connected to the robot control apparatus 30 via wireless communications performed according to communication standards of Wi-Fi (registered trademark) or the like.

The manipulator M has seven joints. Further, each of the seven joints has an actuator (not shown). That is, the arm having the manipulator M is a seven-axis vertical articulated arm. The arm performs actions on the degree of freedom of seven axes by cooperative motion of the support, the end effector E, the manipulator M, and the respective actuators of the seven joints of the manipulator M. Note that the arm may be adapted to operate on the degree of freedom of six or less axes or operate on the degree of freedom of eight or more axes.

When the arm operates on the degree of freedom of seven axes, the number of attitudes that can be taken is larger than that in the case where the arm operates on the degree of freedom of six or less axes. Thereby, the arm may smoothly move and easily avoid interferences with objects existing around the arm, for example. Further, when the arm operates on the degree of freedom of seven axes, control of the arm is easier than that in the case where the arm operates on the degree of freedom of eight or more axes because the calculation amount is less.

The seven actuators (of the joints) of the manipulator M are respectively communicably connected to the robot control apparatus 30 by cables. Thereby, the actuators operate the manipulator M based on the control signals acquired from the robot control apparatus 30. Wired communications via the cables are performed according to standards of e.g. Ethernet (registered trademark), USB, or the like. Or, part or all of the seven actuators of the manipulator M may be adapted to be connected to the robot control apparatus 30 via wireless communications performed according to communication standards of Wi-Fi (registered trademark) or the like.

The force detection unit 21 is provided between the end effector E and the manipulator M. The force detection unit 21 is e.g. a force sensor. The force detection unit 21 detects force and moment (torque) acting on the end effector E or an object grasped by the end effector E. The force detection unit 21 outputs force detection information containing a value indicating the magnitude of the detected force or moment as an output value to the robot control apparatus 30 via communications.

The force detection information is used for control based on the force detection information of the arm by the robot control apparatus 30. The control based on the force detection information refers to e.g. compliance control such as impedance control. Note that the force detection unit 21 may be another sensor such as a torque sensor that detects a value indicating the magnitude of the force or moment acting on the end effector E or the object grasped by the end effector E.

The force detection unit 21 is communicably connected to the robot control apparatus 30 by a cable. Wired communications via the cable are performed according to standards of e.g. Ethernet (registered trademark), USB, or the like. Or, the force detection unit 21 and the robot control apparatus 30 may be adapted to be connected via wireless communications performed according to communication standards of Wi-Fi (registered trademark) or the like.

Note that the robot 20 may include one or more imaging units in addition to the above described functional parts. In the example, the case of the robot 20 without the imaging unit is explained.

The robot control apparatus 30 transmits the control signals to the robot 20 to operate the robot 20. Thereby, the robot control apparatus 30 allows the robot 20 to perform a predetermined work. Note that the robot control apparatus 30 may be built in the robot 20 instead of being installed outside of the robot 20.

Outline of Predetermined Work Performed by Robot

As below, an outline of a predetermined work performed by the robot 20 in the first embodiment will be explained.

In FIG. 1, the robot 20 grasps a first object with the end effector E in advance. Note that the robot 20 may be adapted to grasp the first object placed in a predetermined feed region instead of grasping the first object in advance.

The first object is an object having one or more parts that can be respectively inserted into one or more insertion portions of a second object. The part may be the whole first object. For example, the first object is an electronic component having two pins that can be inserted into holes of a substrate. As below, as an example, the case where the first object is a capacitor EP having a pin P1 and a pin P2 having a shorter length than the length of the pin P1 as the two pins will be explained. Note that the robot control apparatus 30 may be adapted to execute processing, which will be descried later, with the first object as one or both of the pin P1 and the pin P2. Or, the first object may be an industrial component, member, device, or the like or a living organism or the like in place of the electronic component.

The second object is an object having one or more insertion portions into which at least a part of the first object can be inserted. For example, the second object is a substrate having one or more holes into which the pins of the electronic component can be inserted as the insertion portions. As below, as an example, the case where the second object is a substrate B having two holes into which the pin P1 and the pin P2 of the capacitor EP as the example of the first object can be respectively inserted will be explained. In FIG. 1, the substrate B is supported by a jig G.

Note that the second object may be an industrial component, member, device, or the like or a living organism or the like in place of the substrate B. In FIG. 1, the substrate B is supported by the jig G provided on the contact surface of the robot 20 (e.g. floor surface), however, may be supported by the jig G provided in another position of a wall surface, a ceiling surface, or the like.

The robot 20 inserts the pin P1 of the capacitor EP into a hole H1 as one hole of the two holes of the substrate B as a predetermined work. Then, after inserting the pin P1 into the hole H1, the robot 20 inserts the pin P2 of the capacitor EP into a hole H2 different from the H1 of the two holes of the substrate B while keeping the pin P1 inserted into the hole H1. That is, the hole H1 and the hole H2 are respective examples of insertion portions of the second object.

Outline of Processing Performed by Robot Control Apparatus

As below, an outline of processing performed by the robot control apparatus 30 for allowing the robot 20 to perform the predetermined work in the first embodiment will be explained.

In the example, on the end of the pin P1 of the capacitor EP, a control point T1 as the first TCP (Tool Center Point) moving with the end is set. For the control point T1, a three-dimensional local coordinate system representing the position and the attitude of the pin P1 is set. The origin of the three-dimensional local coordinate system indicates the position of the control point T1 i.e. the end of the pin P1. Further, the directions of the respective coordinate axes of the three-dimensional local coordinate system indicate the attitude of the control point T1 i.e. the end of the pin P1.

On the end of the pin P2 of the capacitor EP, a control point T2 as the second TCP moving with the end is set. For the control point T2, a three-dimensional local coordinate system representing the position and the attitude of the pin P2 is set. The origin of the three-dimensional local coordinate system indicates the position of the control point T2 i.e. the end of the pin P2. Further, the directions of the respective coordinate axes of the three-dimensional local coordinate system indicate the attitude of the control point T2 i.e. the end of the pin P2.

The robot control apparatus 30 moves the capacitor EP by the arm based on position information as information representing the respective positions of the hole H1 and the H2 stored in advance, and thereby, moves the control point T1 of the pin P1 to a first waiting position as a predetermined waiting position and sets the attitude of the control point T1 to a predetermined waiting attitude. The first waiting position is a position indicating the start point of the control point T1 in a first insertion action as an action of moving the capacitor EP closer to the substrate B of the actions that the robot control apparatus 30 allows the robot 20 to perform in the predetermined work.

In the example, the position of the hole H1 refers to a position of the center of the hole H1 on the surface of the substrate B on the side into which the pin P1 is inserted. Note that the position of the hole H1 may be another position associated with the hole H1 instead. Further, in the example, the position of the hole H2 refers to a position of the center of the hole H2 on the surface of the substrate B on the side into which the pin P2 is inserted. Note that the position of the hole H2 may be another position associated with the hole H2 instead.

The position information may be information representing relative positions from a reference position as a position of reference to the respective positions of the hole H1 and the hole H2 in place of the information representing the respective positions of the hole H1 and the hole H2. For example, in the case where the robot 20 is installed on a pedestal and the pedestal on which the robot 20 is installed and a pedestal on which the jig G supporting the substrate B is installed are different, the respective positions of the hole H1 and the hole H2 represented by the position information stored in the robot control apparatus 30 in advance and the respective present positions of the hole H1 and the hole H2 may be different due to vibration or the like.

In this case, a reference position is provided on the pedestal on which the jig G is installed, the information representing the relative positions from the reference position to the respective positions of the hole H1 and the hole H2 is stored in the robot control apparatus 30 in advance, and thereby, the robot control apparatus 30 may perform the predetermined work by storing only the reference position again without storing the respective positions of the hole H1 and the hole H2 again. As a result, a user may shorten the period taken for storing the respective positions of the hole H1 and the hole H2 in the predetermined work by the robot control apparatus 30.

Note that the robot control apparatus 30 may be adapted to store the reference position by direct teaching, and may be adapted to attach a marker to the reference position and detect the reference position by imaging of the marker by an imaging unit. The direct teaching is, in summary, such that the user grasps the end effector E, moves the TCP to a desired position, and allows the position of the moved TCP in the robot control apparatus 30 to be stored based on the control according to the force detection information acquired from the force detection unit 21.

The robot control apparatus 30 moves the control point T1 to the first waiting position as a start point in the first insertion action by the arm, then, allows the robot 20 to perform the first insertion action, and thereby, starts to move the capacitor EP closer to the substrate B. Specifically, the robot control apparatus 30 starts to move the capacitor EP in the first direction in which the capacitor EP and the substrate B are closer to each other by the arm. During the first insertion action, the robot control apparatus 30 repeats determination as to whether or not the capacitor EP (pin P1) has come into contact with a position different from the hole H1 based on the force detection information. The robot control apparatus 30 allows the robot 20 to keep on continuing the first insertion action as long as the determination that the capacitor EP (pin P1) is not in contact with a position different from the hole H1 based on the force detection information is maintained. Then, the robot control apparatus 30 inserts the pin P1 into the hole H1 by the arm.

On the other hand, if determining that the capacitor EP (pin P1) has come into contact with a position different from the hole H1 based on the force detection information during the first insertion action, the robot control apparatus 30 separates the capacitor EP and the substrate B by the arm. Thereby, the robot control apparatus 30 may suppress deformation of the capacitor EP and the substrate B when the capacitor EP (pin P1) comes into contact with a position different from the hole H1 of the substrate B.

Further, when separating the capacitor EP and the substrate B, the robot control apparatus 30 sets a position different from the first waiting position at the time immediately before of the previous times when the control point T1 waits in the first waiting position as a new first waiting position, and moves the control point T1 to the first waiting position. Thereby, the robot control apparatus 30 separates the capacitor EP and the substrate B and changes the relative position relationship between the previous first waiting position and the position of the hole H1 to a new relative position relationship between the new first waiting position and the hole H1. That is, the robot control apparatus 30 separates the capacitor EP and the substrate B and changes the start point of the control point T1 in the first insertion action to a start position different from the previous start point at each time when separating the capacitor EP and the substrate B. Then, the robot control apparatus 30 allows the robot 20 to perform the first insertion action again, and thereby, moves the capacitor EP closer to the substrate B.

As described above, even when the robot control apparatus 30 determines that the capacitor EP (pin P1) has come into contact with a position different from the hole H1 based on the force detection information, the movement of the capacitor EP closer to the substrate B and the separation of the capacitor EP from the substrate B are repeated by the arm, and thereby, the pin P1 may be inserted into the hole H1 while deformation of one or both of the capacitor EP and the substrate B is suppressed.

After the pin P1 is inserted into the hole H1, the robot control apparatus 30 moves the control point T2 to a second waiting position as a position different from the first waiting position by the arm with the pin P1 kept inserted into the hole H1. The second waiting position is a position indicating a start point of the control point T2 in the second insertion action as an action of moving the capacitor EP closer to the substrate B with pin P1 kept inserted into the hole H1 of the actions that the robot control apparatus 30 allows the robot 20 to perform in the predetermined work.

The robot control apparatus 30 moves the control point T2 to the second waiting position as the start point in the second insertion action by the arm, then, allows the robot 20 to perform the second insertion action, and thereby, starts to move the capacitor EP closer to the substrate B. Specifically, the robot control apparatus 30 starts to move the capacitor EP in the first direction in which the capacitor EP and the substrate B are closer to each other by the arm. During the second insertion action, the robot control apparatus 30 repeats determination as to whether the capacitor EP (pin P2) has come into contact with a position different from the hole H2 based on the force detection information. The robot control apparatus 30 allows the robot 20 to keep on continuing the second insertion action as long as the determination that the capacitor EP (pin P2) is not in contact with a position different from the hole H2 based on the force detection information is maintained. Then, the robot control apparatus 30 inserts the pin P2 into the hole H2 by the arm.

On the other hand, if determining that the capacitor EP (pin P2) has come into contact with a position different from the hole H2 based on the force detection information during the second insertion action, the robot control apparatus 30 separates the capacitor EP and the substrate B by the arm with the pin P1 kept inserted into the hole H1. Thereby, the robot control apparatus 30 may suppress deformation of one or both of the capacitor EP and the substrate B when the capacitor EP (pin P2) comes into contact with a position different from the hole H2 of the substrate B.

Further, when separating the capacitor EP and the substrate B with the pin P1 kept inserted into the hole H1, the robot control apparatus 30 sets a position different from the second waiting position at the time immediately before of the previous times when the control point T2 waits in the second waiting position as a new second waiting position, and moves the control point T2 to the second waiting position. Thereby, the robot control apparatus 30 separates the capacitor EP and the substrate B and changes the relative position relationship between the previous second waiting position and the position of the hole H2 to a new relative position relationship between the new second waiting position and the hole H2 with the pin P1 kept inserted into the hole H1. That is, the robot control apparatus 30 separates the capacitor EP and the substrate B with the pin P1 kept inserted into the hole H1 and changes the start point of the control point T2 in the second insertion action to a start position different from the previous start point at each time when separating the capacitor EP and the substrate B. Then, the robot control apparatus 30 allows the robot 20 to perform the second insertion action with the pin P1 kept inserted into the hole H1, and thereby, moves the capacitor EP closer to the substrate B.

As described above, even when the robot control apparatus 30 determines that the capacitor EP (pin P2) has come into contact with a position different from the hole H2 based on the force detection information, the movement of the capacitor EP closer to the substrate B and the separation of the capacitor EP and the substrate B are repeated, and thereby, the pin P2 may be inserted into the hole H2 while deformation of both of the capacitor EP and the substrate B is suppressed.

As a result, the robot control apparatus 30 may insert the pin P1 into the hole H1 and insert the pin P2 into the hole H2 by the arm while suppressing deformation of one or both of the capacitor EP and the substrate B.

In the first embodiment, processing of separating the capacitor EP and the substrate B by the robot control apparatus 30 if the determination that the capacitor EP (pin P1) has come into contact with a position different from the hole H1 is made based on the force detection information and if the determination that the capacitor EP (pin P2) has come into contact with a position different from the hole H2 is made based on the force detection information is explained in detail.

Outlines of Capacitor and Substrate

Figure 2:
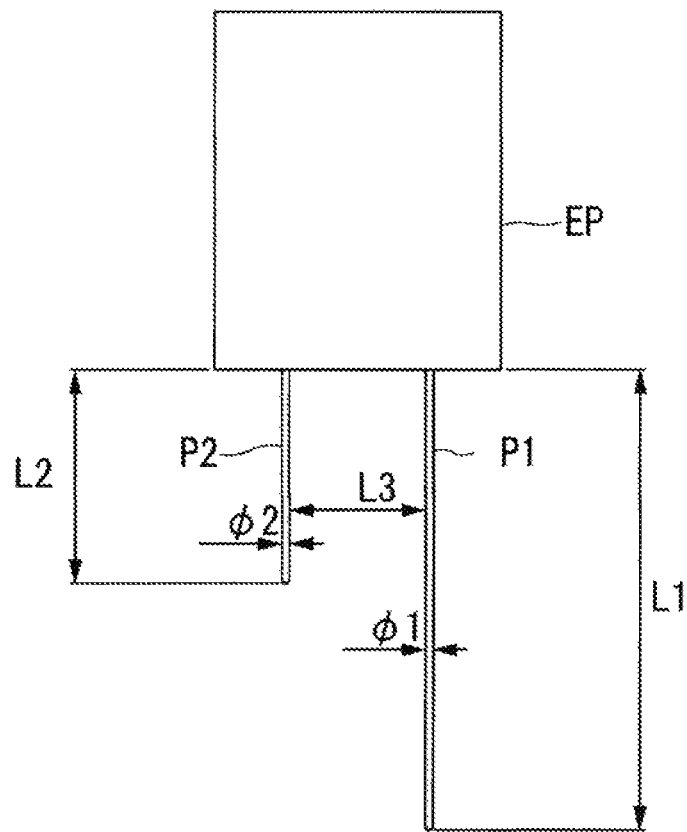
FIG. 2 shows an example of a capacitor EP when the capacitor EP is seen from a direction horizontal to a surface on which both a pin P1 and a pin P2 are provided of surfaces of the capacitor EP.

As below, the respective outlines of the capacitor EP and the substrate B will be explained with reference to FIGS. 2 to 4. FIG. 2 shows an example of the capacitor EP when the capacitor EP is seen from a direction horizontal to a surface on which both the pin P1 and the pin P2 are provided of the surfaces of the capacitor EP. The pin P1 is provided on the capacitor EP from the surface in a direction orthogonal to the surface. The length of the pin P1 from the surface to the end is a length L1 (in millimeters, for example). The length L1 is e.g. 32 millimeters. Note that the length L1 may be another length instead.

Further, the pin P2 is provided on the capacitor EP from the surface in a direction orthogonal to the surface. The length of the pin P2 from the surface to the end is a length L2 (in millimeters, for example). The length L2 is e.g. 22 millimeters. Note that the length L2 may be another length instead.

The diameter of the pin P1 is a diameter $\phi 1$ (in millimeters, for example). The diameter $\phi 1$ is e.g. 0.6 millimeters. Note that the diameter $\phi 1$ may be another diameter instead.

Further, the diameter of the pin P2 is a diameter $\phi 2$ (in millimeters, for example). The diameter $\phi 2$ is e.g. 0.6 millimeters. Note that the diameter $\phi 2$ may be another diameter instead and different from the diameter $\phi 1$.

The distance between the pin P1 and the pin P2 is a distance L3 (in millimeters, for example). The distance L3 is e.g. 10 millimeters. Note that the distance L3 may be another distance instead.

Note that the capacitor EP may have a configuration with only one pin or three or more pins. The length of the pin P1 and the length of the pin P2 may be the same.

Figure 3:
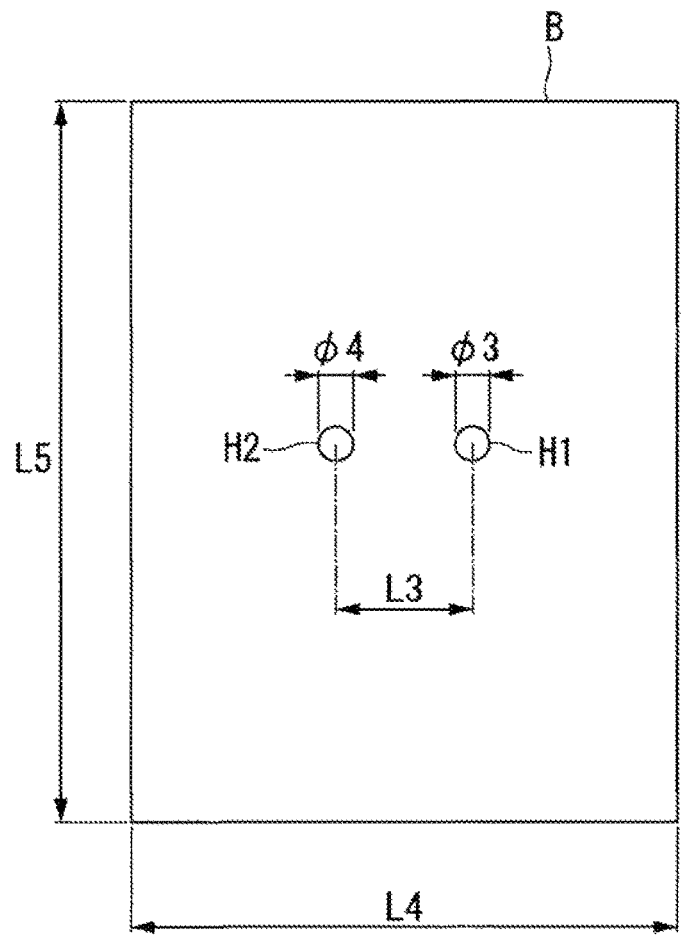
FIG. 3 shows an example of a surface on a side into which the pin P1 is inserted of surfaces of a substrate B.
Figure 4:
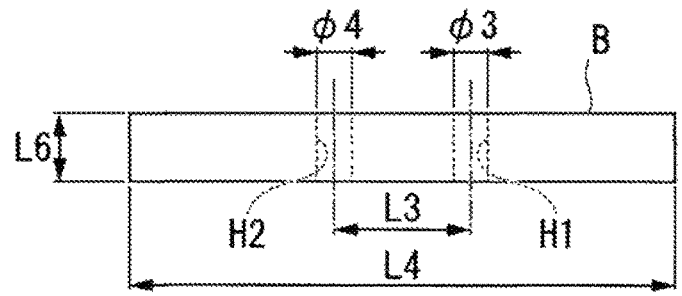
FIG. 4 is a side view of the substrate B shown in FIG. 3.

FIG. 3 shows an example of the surface on the side into which the pin P1 is inserted of the surfaces of the substrate B. Further, FIG. 4 is a side view of the substrate B shown in FIG. 3. As shown in FIGS. 3 and 4, in the substrate B, the hole H1 having a diameter of a diameter $\phi 3$ (in millimeters, for example) and the hole H2 having a diameter of a diameter $\phi 4$ (in millimeters, for example) are formed.

The diameter $\phi 3$ is e.g. 0.8 millimeters. Note that the diameter $\phi 3$ may be another diameter instead. The diameter $\phi 4$ is e.g. 0.8 millimeters. Note that the diameter $\phi 4$ may be another diameter instead. The distance from the center of the hole H1 to the center of the hole H2 is the distance L3.

Further, the shape of the surface on the side into which the pin P1 is inserted of the surfaces of the substrate B is a rectangular shape. The length of the short side of the rectangle is a length L4 (in millimeters, for example). The length L4 is e.g. 45 millimeters. Note that the length L4 may be another length instead. The length of the long side of the rectangle is a length L5 (in millimeters, for example). The length L5 is e.g. 60 millimeters. Note that the length L5 may be another length instead.

Furthermore, the thickness of the substrate B in the direction in which the hole of the pin P1 extends is a thickness L6 (in millimeters, for example). The thickness L6 is e.g. 1 millimeter. Note that the thickness L6 may be another thickness instead.

Hardware Configuration of Robot Control Apparatus

Figure 5:
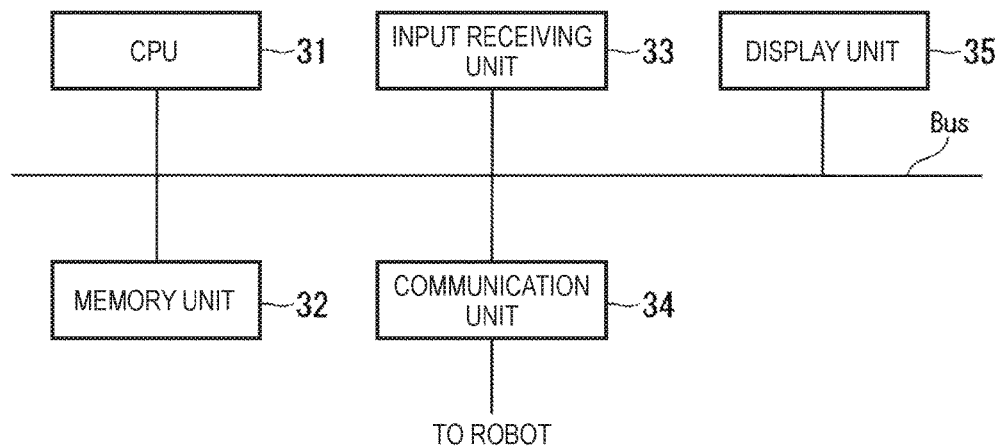
FIG. 5 shows an example of a hardware configuration of a robot control apparatus 30.

As below, a hardware configuration of the robot control apparatus 30 will be explained with reference to FIG. 5. FIG. 5 shows an example of the hardware configuration of the robot control apparatus 30. The robot control apparatus 30 includes e.g. a CPU (Central Processing Unit) 31, a memory unit 32, an input receiving unit 33, a communication unit 34, and a display unit 35. Further, the robot control apparatus 30 communicates with the robot 20 via the communication unit 34. These component elements are communicably connected to one another via a bus Bus.

The CPU 31 executes various programs stored in the memory unit 32.

The memory unit 32 may include e.g. an HDD (Hard Disk Drive), an SSD (Solid State Drive), an EEPROM (Electrically Erasable Programmable Read-Only Memory), a ROM (Read-Only Memory), a RAM (Random Access Memory), or the like. Note that the memory unit 32 may be an external memory unit connected via a digital I/O port including USB or the like in place of the unit built in the robot control apparatus 30. The memory unit 32 stores various kinds of information, images, programs to be processed by the robot control apparatus 30, position information respectively representing the position of the hole H1 and the position of the hole H2, the first waiting position information and the second waiting position information, etc. Here, the first waiting position information and the second waiting position information are explained.

The first waiting position information includes information in which information representing the relative position from the first waiting position to the hole H1 and information representing the execution sequence of the first insertion action repeatedly performed in the predetermined work by the robot 20 are associated with each other. For example, when the execution sequence is zero, information representing the position associated with the information representing the execution sequence as the relative position from the first waiting position to the hole H1 is information representing the position in the first-time first insertion action as the relative position from the first waiting position to the hole H1. Further, when the execution sequence is one, information representing the position associated with the information representing the execution sequence as the relative position from the first waiting position to the hole H1 is information representing the position in the second-time first insertion action as the relative position from the first waiting position to the hole H1. That is, the robot control apparatus 30 specifies a first waiting position according to the execution sequence of the first insertion action and moves the control point T1 to the first waiting position at each time when allowing the robot 20 to perform the first insertion action based on the position of the hole H1 represented by the position information and the first waiting position information.

The second waiting position information includes information in which information representing the relative position from the second waiting position to the hole H2 and information representing the execution sequence of the second insertion action repeatedly performed in the predetermined work by the robot 20 are associated with each other. For example, when the execution sequence is zero, information representing the position associated with the information representing the execution sequence as the relative position from the second waiting position to the hole H2 is information representing the position in the first-time second insertion action as the relative position from the second waiting position to the hole H2. Further, when the execution sequence is one, information representing the position associated with the information representing the execution sequence as the relative position from the second waiting position to the hole H2 is information representing the position in the second-time second insertion action as the relative position from the second waiting position to the hole H2. That is, the robot control apparatus 30 specifies a second waiting position according to the execution sequence of the second insertion action and moves the control point T2 to the second waiting position at each time when allowing the robot 20 to perform the second insertion action based on the position of the hole H2 represented by the position information and the second waiting position information.

The input receiving unit 33 is an input device such as e.g. a teaching pendent including a keyboard, a mouse, a touch pad, etc. Note that the input receiving unit 33 may be integrally formed with the display unit 35 as a touch panel.

The communication unit 34 includes e.g. a digital I/O port such as USB, an Ethernet (registered trademark) port, etc.

The display unit 35 is e.g. a liquid crystal display panel or an organic EL (ElectroLuminescence) display panel.

Functional Configuration of Robot Control Apparatus

Figure 6:
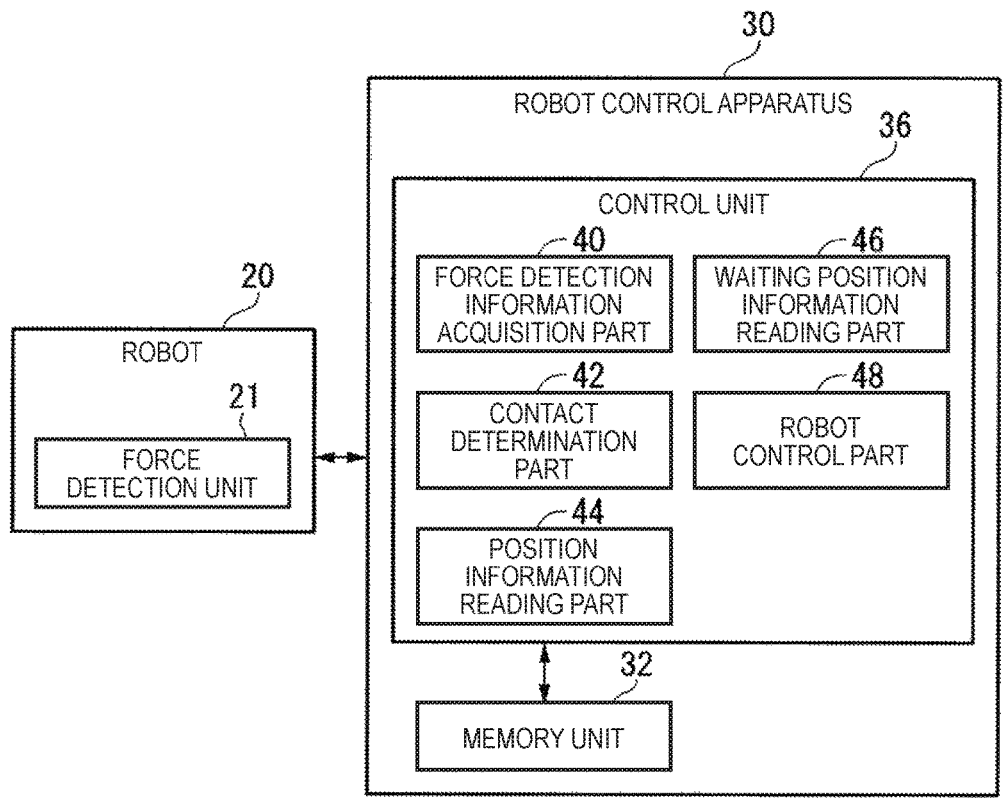
FIG. 6 shows an example of a functional configuration of the robot control apparatus 30.

As below, a functional configuration of the robot control apparatus 30 will be explained with reference to FIG. 6. FIG. 6 shows an example of the functional configuration of the robot control apparatus 30. The robot control apparatus 30 includes the memory unit 32 and the control unit 36.

The control unit 36 controls the entire robot control apparatus 30. The control unit 36 includes a force detection information acquisition part 40, a contact determination part 42, a position information reading part 44, a waiting position information reading part 46, and a robot control part 48. These functional parts of the control unit 36 are realized by the CPU 31 executing various programs stored in the memory unit 32. Further, part or all of the functional parts may be a hardware functional part such as an LSI (Large Scale Integration) or an ASIC (Application Specific Integrated Circuit).

The force detection information acquisition part 40 acquires the force detection information from the force detection unit 21.

The contact determination part 42 determines whether or not the first object has come into contact with a position different from an insertion portion (e.g. the above described hole H1 and hole H2) of the second object based on the force detection information acquired by the force detection information acquisition part 40.

The position information reading part 44 reads the position information from the memory unit 32.

The waiting position information reading part 46 reads the first waiting position information and the second waiting position information from the memory unit 32.

The robot control part 48 operates the robot 20 based on part or all of the force detection information acquired by the force detection information acquisition part 40, the determination result determined by the contact determination part 42, the position information read from the memory unit 32 by the position information reading part 44, and the first waiting position information and the second waiting position information read from the memory unit 32 by the waiting position information reading part 46.

Figure 7:
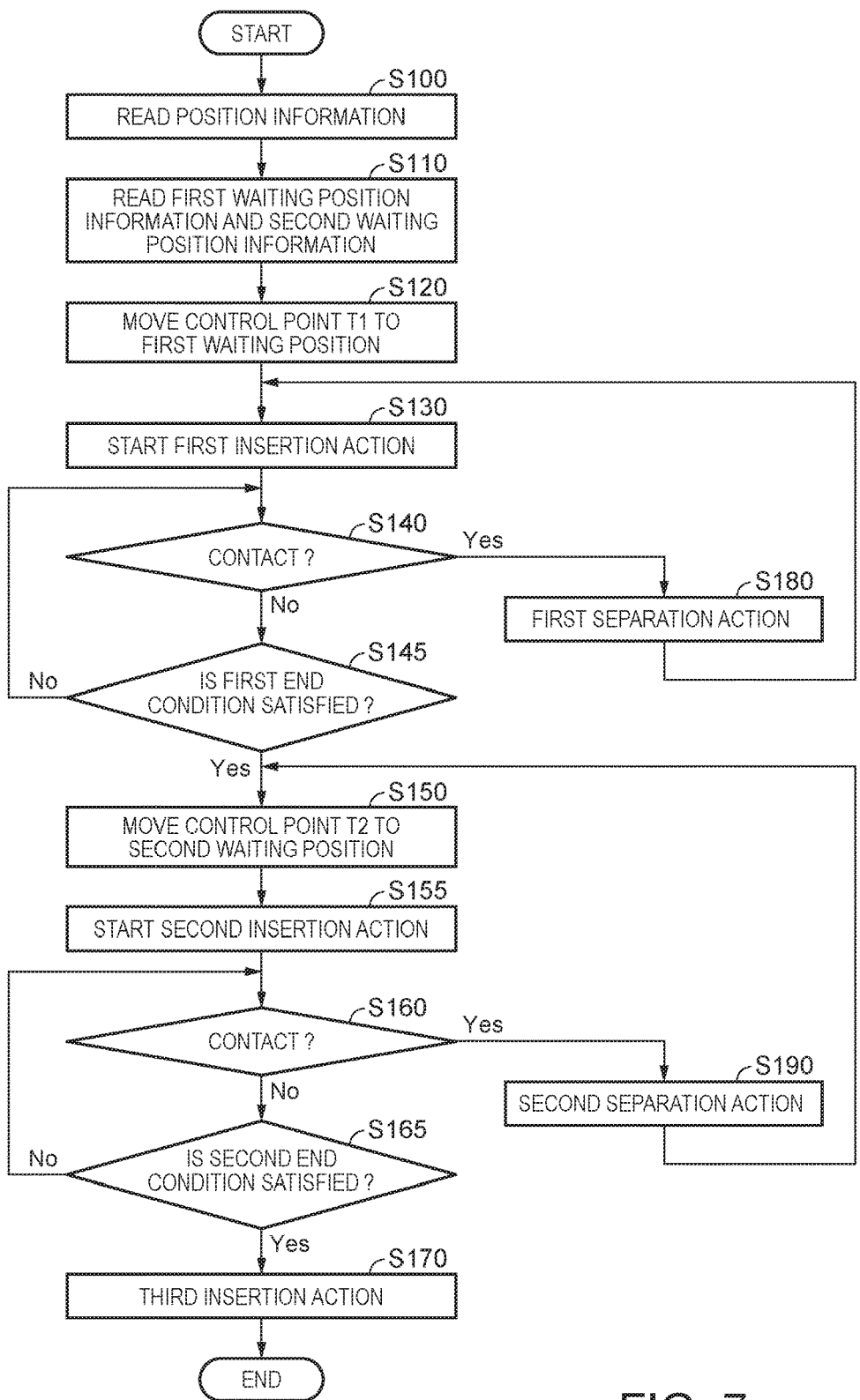
FIG. 7 is a flowchart showing an example of a flow of processing of allowing a robot 20 to perform a predetermined work by the robot control apparatus 30 in the first embodiment.

Processing of Allowing Robot to Perform Predetermined Work by Robot Control Apparatus As below, processing of allowing the robot 20 to perform the predetermined work by the robot control apparatus 30 in the first embodiment will be explained with reference to FIG. 7. FIG. 7 is a flowchart showing an example of a flow of the processing of allowing the robot 20 to perform the predetermined work by the robot control apparatus 30 in the first embodiment.

The position information reading part 44 reads the position information from the memory unit 32 (step S100). Then, the waiting position information reading part 46 reads the first waiting position information and the second waiting position information from the memory unit 32 (step S110). Then, the robot control part 48 moves the control point T1 to the first-time first waiting position and sets the attitude of the control point T1 in the first waiting position to align with a predetermined waiting attitude based on the position of the hole H1 represented by the position information read from the memory unit 32 by the position information reading part 44 at step S100 and the first waiting position information read from the memory unit 32 by the waiting position information reading part 46 (step S120). Then, the robot control part 48 performs initialization so that the information representing the execution sequence of the first insertion action may represent zero and stores the information. Here, referring to FIG. 8, the processing at step S120 is explained.

Figure 8:
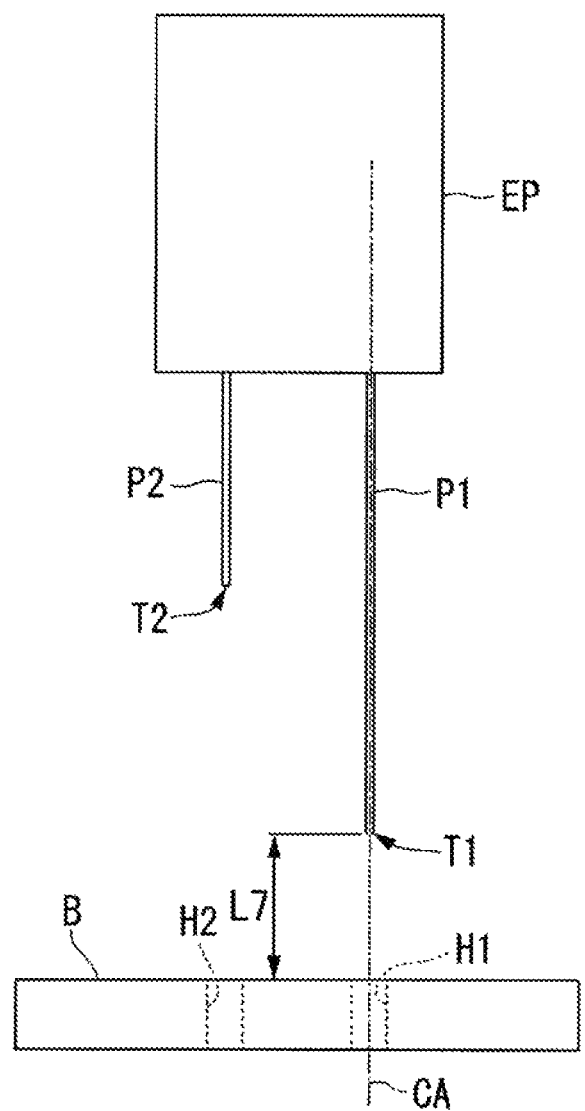
FIG. 8 shows an example of a state of the capacitor EP and the substrate B when a control point T1 moves to a first waiting position in a first-time first insertion action.

FIG. 8 shows an example of a state of the capacitor EP and the substrate B when the control point T1 moves to the first waiting position in the first-time first insertion action. As shown in FIG. 8, the first waiting position in the first-time first insertion action is a position on a center axis CA of the hole H1 extending in a direction orthogonal to the surface on the side into which the pin P1 is inserted of the surfaces of the substrate B apart at a distance L7 (in millimeters, for example) from the surface toward the capacitor EP. The distance L7 is e.g. 10 millimeters. Note that the distance L7 may be another distance instead.

Further, the predetermined waiting attitude is an attitude in which, when the capacitor EP is moved in the first direction in which the capacitor EP and the substrate B are closer to each other in the first insertion action, the pin P1 can be inserted into the hole H1. Specifically, the predetermined waiting attitude is an attitude in which the center axis of the pin P1 extending in the direction orthogonal to the surface of the capacitor EP with the pin P1 provided thereon and the center axis CA are aligned. That is, the first direction in the first insertion action is the direction in which the capacitor EP and the substrate B are closer to each other along the center axis CA in the example.

Figure 9:
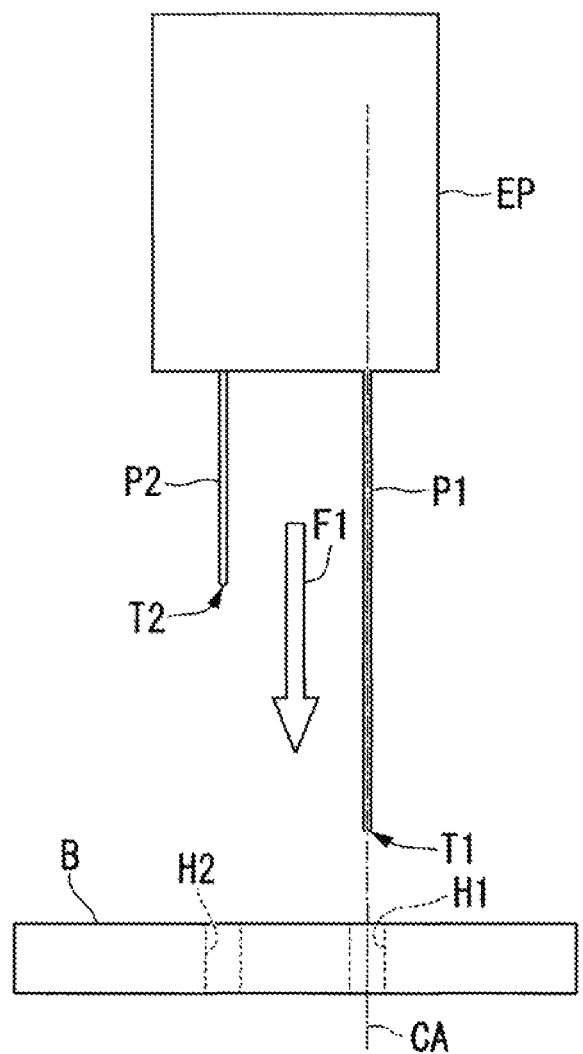
FIG. 9 shows an example of the state of the capacitor EP and the substrate B immediately after the first insertion action is started.

Then, the robot control part 48 allows the robot 20 to start the first insertion action (step S130). Here, referring to FIG. 9, processing at step S130 is explained. FIG. 9 shows an example of the state of the capacitor EP and the substrate B immediately after the first insertion action is started. As shown in FIG. 9, the robot control part 48 starts to move the capacitor EP in the first direction F1 in which the capacitor EP and the substrate B are closer to each other by the arm. The first direction F1 is the direction in which the capacitor EP and the substrate B are closer to each other along the center axis CA as described above. Further, in the first insertion action, the robot control part 48 performs the first insertion action under the control based on the force detection information acquired from the force detection unit 21 by the force detection information acquisition part 40.

Then, the contact determination part 42 determines whether or not the capacitor EP (pin P1) has come into contact with a position different from the hole H1 in the first insertion action started from step S130 based on the force detection information acquired from the force detection unit 21 by the force detection information acquisition part 40 (step S140). If determining that a force applied to the pin P1 in the direction orthogonal to the surface of the capacitor EP with the pin P1 provided thereon is equal to or more than a predetermined first threshold value based on the force detection information acquired from the force detection unit 21, the contact determination part 42 determines that the capacitor EP (pin P1) has come into contact with a position different from the hole H1. The first threshold value is a force less than load with which the pin P1 buckles. On the other hand, if determining that the force applied to the pin P1 in the direction orthogonal to the surface of the capacitor EP with the pin P1 provided thereon is less than the predetermined first threshold value based on the force detection information acquired from the force detection unit 21, the contact determination part 42 determines that the capacitor EP (pin P1) has not come into contact with a position different from the hole H1. If the contact determination part 42 determines that the capacitor EP (pin P1) has not come into contact with a position different from the hole H1 (step S140—No), the robot control part 48 determines whether or not a first end condition as a condition for ending the first insertion action has been satisfied (step S145). Here, referring to FIG. 10, the first end condition is explained.

Figure 10:
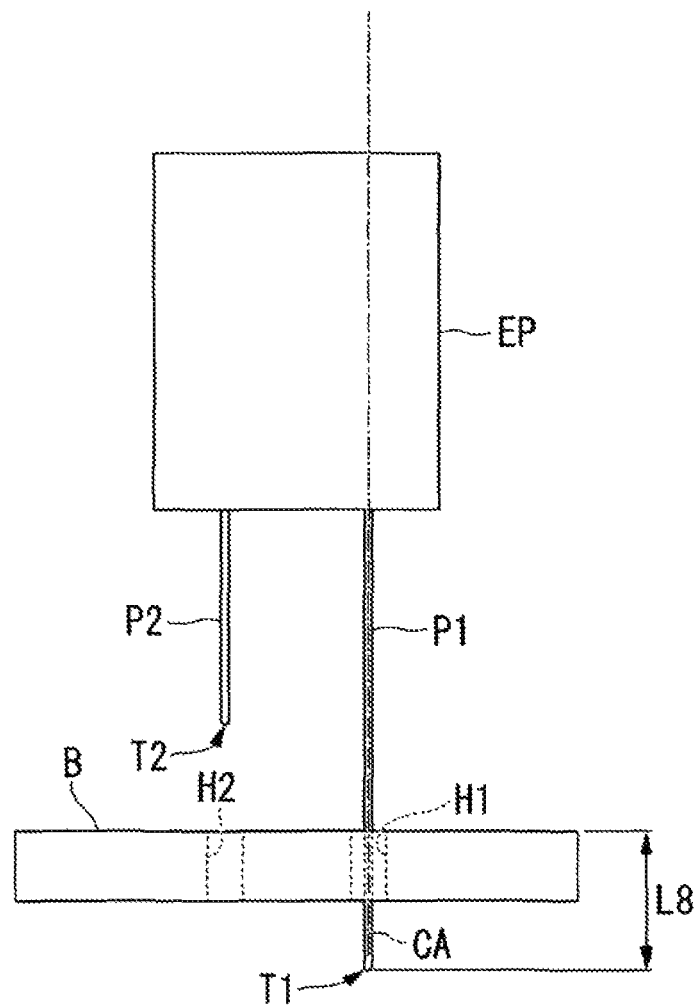
FIG. 10 shows an example of the state of the capacitor EP and the substrate B when a first end condition is satisfied.

FIG. 10 shows an example of the state of the capacitor EP and the substrate B when the first end condition is satisfied. In the example, the first end condition is that the position of the control point T1 on the above described center axis CA is apart at a distance L8 (in millimeters, for example) from the surface on the side into which the pin P1 is inserted of the surfaces of the substrate B in the first direction F1. In the example shown in FIG. 10, the position of the control point T1 on the center axis CA is apart at the distance L8 from the surface in the first direction F1. The distance L8 is e.g. 10 millimeters. Note that the distance L8 may be another distance instead. Further, the first end condition may be another condition instead.

At step S145, if the robot control part 48 determines that the first end condition is not satisfied (step S145—No), the contact determination part 42 transitions to step S140 and determines whether or not the capacitor EP (pin P1) has come into contact with a position different from the hole H1 again. On the other hand, if determining that the first end condition is satisfied (step S145—Yes), the robot control part 48 stops the movement of the control point T1 in the first direction F1 and ends the first insertion action. Then, the robot control part 48 moves the control point T2 to the first-time second waiting position based on the position of the hole H2 represented by the position information read from the memory unit 32 by the position information reading part 44 at step S100 and the second waiting position information read from the memory unit 32 by the waiting position information reading part 46 at step S110 (step S150).

On the other hand, at step S140, if the contact determination part 42 determines that the capacitor EP (pin P1) has come into contact with a position different from the hole H1 (step S140—Yes), the robot control part 48 increments the execution sequence represented by the information representing the execution sequence of the first insertion action in the predetermined work by one. Then, the robot control part 48 specifies the first waiting position based on the position of the hole H1 represented by the position information read from the memory unit 32 by the position information reading part 44 at step S100, the first waiting position information read from the memory unit 32 by the waiting position information reading part 46 at step S110, and the information representing the execution sequence according to the execution sequence represented by the information. The robot control part 48 moves the capacitor EP in another direction than the opposite direction to the first direction of the directions in which the capacitor EP and the substrate B are farther from each other based on the specified first waiting position, and thereby, separates the capacitor EP and the substrate B and allows the robot 20 to perform the first separation action of moving the control point T1 to the first waiting position (step S180). After the first separation action is performed at step S180, the robot control part 48 transitions to step S130 and starts the first insertion action again. Here, referring to FIGS. 11 and 12, the states of the capacitor EP and the substrate B when the capacitor EP (pin P1) comes into contact with a position different from the hole H1 and the first separation action at step S180 are explained.

Figure 11:
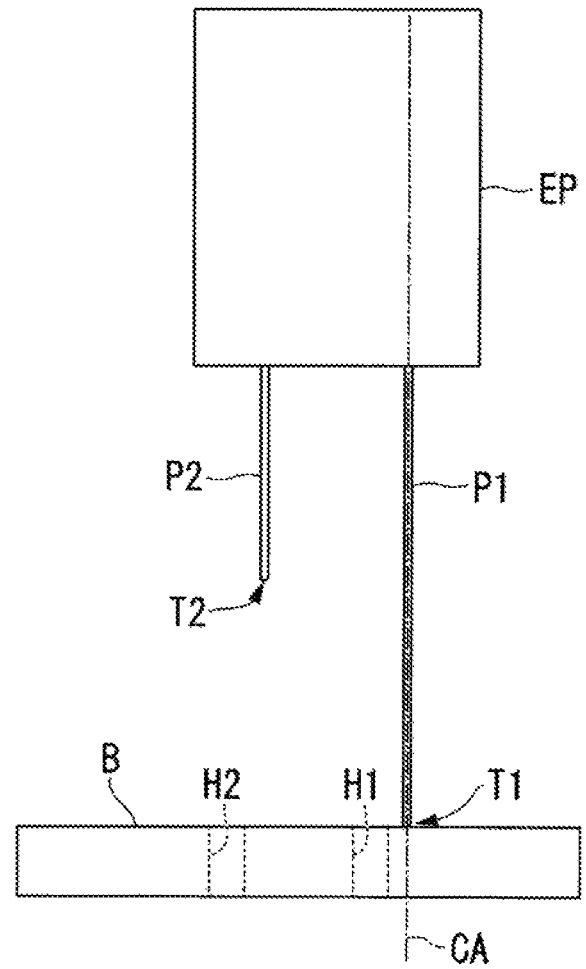
FIG. 11 shows an example of the state of the capacitor EP and the substrate B when the capacitor EP (pin P1) comes into contact with a position different from a hole H1.

FIG. 11 shows an example of the state of the capacitor EP and the substrate B when the capacitor EP (pin P1) comes into contact with a position different from the hole H1. Even when the control point T1 is moved to the first waiting position in the first-time first insertion action at step S130, the pin P1 of the capacitor EP may come into contact with a position different from the hole H1 because of errors such as errors due to rigidity of the arm and errors with respect to the position in which the substrate B is provided. The state in FIG. 11 shows the example of the state in which the pin P1 has come into contact with a position different from the hole H1 because of the errors. At step S140, if the contact determination part 42 determines that the capacitor EP (pin P1) has come into contact with a position different from the hole H1 as shown in FIG. 11 at step S140, the robot control part 48 performs the first separation action at step S180 as shown in FIG. 12.

Figure 12:
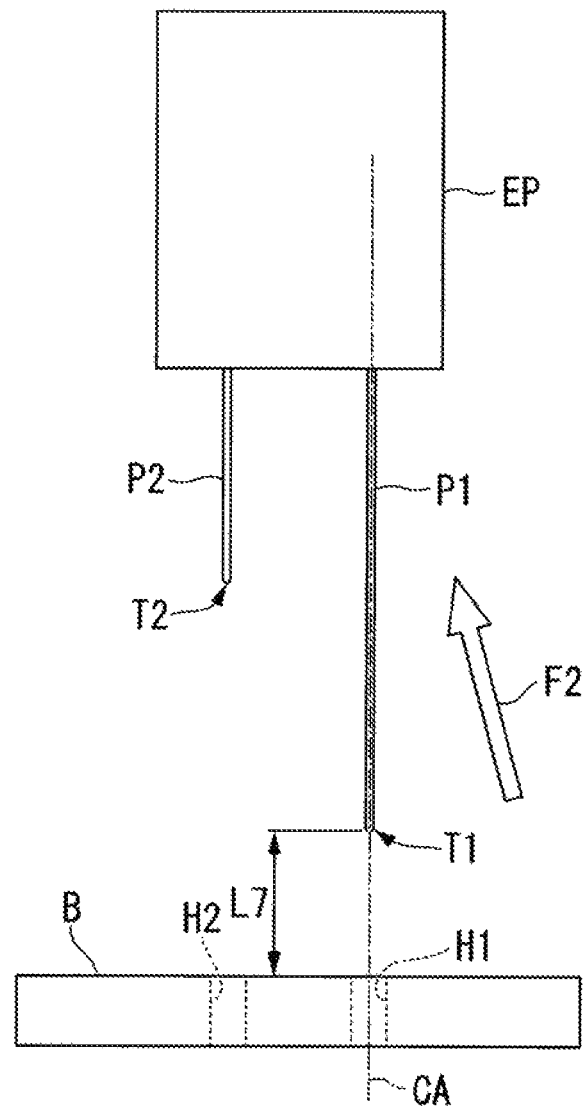
FIG. 12 shows an example of the state of the capacitor EP and the substrate B after a first separation action is performed.

FIG. 12 shows an example of the state of the capacitor EP and the substrate B after the first separation action is performed. As shown in FIG. 12, the robot control part 48 moves the control point T1 (i.e. capacitor EP) in another direction F2 than the opposite direction (i.e. the direction along the center axis CA) to the first direction of the directions in which the capacitor EP and the substrate B are farther from each other, and thereby, separates the capacitor EP and the substrate B and allows the robot 20 to perform the first separation action of moving the control point T1 to a first waiting position different from the previous first waiting position. The first waiting position is a position apart at the distance L7 from the surface on the side into which the pin P1 is inserted of the surfaces of the substrate B in the opposite direction to the first direction F1 as is the case of the first waiting position in the first-time first insertion action. However, after the first separation action, when the surface is seen in the first direction, a position in which the next (present) first waiting position is projected on the surface is a position different from the position in which the first waiting position in the previous first insertion action is projected on the surface. Note that, in the example shown in FIG. 12, after the first separation action is performed, when the surface is seen in the first direction F1, the position in which the first waiting position is projected on the surface coincides with the center of the hole H1 on the surface.

Further, in the first separation action, the robot control part 48 separates the capacitor EP and the substrate B by setting a trajectory of the movement from the position in which the control point T1 is in contact different from the hole H1 to a straight line and moving the control point T1 in another direction than the opposite direction to the first direction F1 of the directions in which the capacitor EP and the substrate B are farther from each other. Thereby, the robot control part 48 may shorten the period taken for moving the capacitor EP to a position to start moving the capacitor EP in the direction in which the capacitor EP and the substrate B are closer to each other again (i.e., first waiting position) after separating the capacitor EP and the substrate B. Note that the robot control part 48 may be adapted to separate the capacitor EP and the substrate B by setting the trajectory of the movement from the position in which the control point T1 is in contact different from the hole H1 to another trajectory than the straight line and moving the control point T1 in another direction than the opposite direction to the first direction F1 of the directions in which the capacitor EP and the substrate B are farther from each other in the first separation action.

Figure 13:
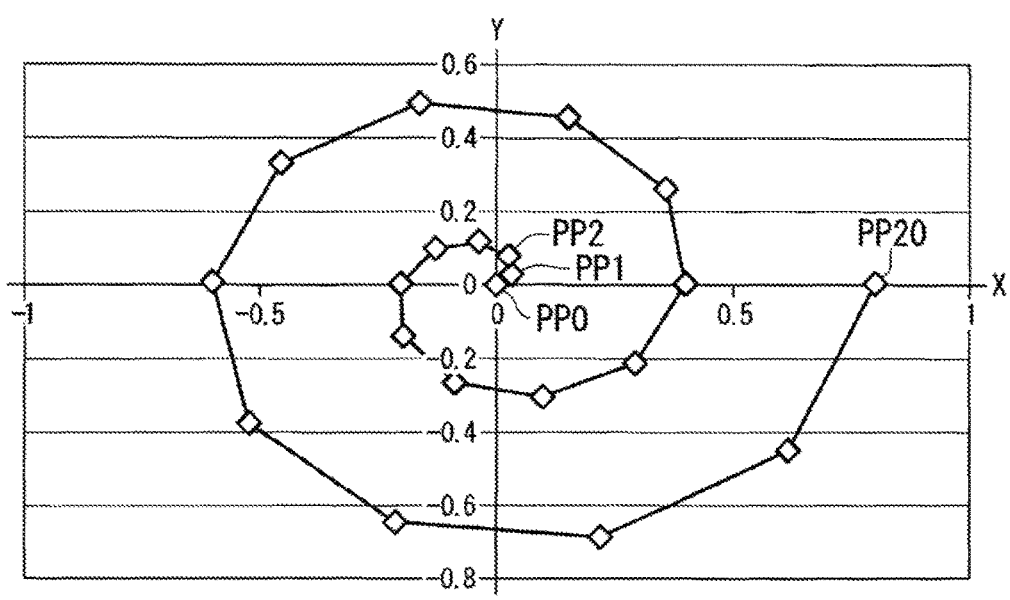
FIG. 13 is a two-dimensional graph on an origin at the center of the hole H1 plotting examples of a first waiting position changing at each time of the first insertion action and projected on the surface on the side into which the pin P1 of the substrate B is inserted as seen from a first direction when the first insertion action and the first separation action are performed at twice or more.

Furthermore, in the example, when the first insertion action and the first separation action are performed at twice or more, that is, when the contact of the capacitor EP (pin P1) with a position different from the hole H1 and the separation of the capacitor EP and the substrate B are performed at twice or more, the robot control part 48 changes the first waiting position along a helical trajectory based on the first waiting position information as shown in FIG. 13. The helical trajectory is a trajectory when the first waiting position is projected on the surface on the side into which the pin P1 is inserted of the surfaces of the substrate B of the trajectories of the first waiting position. FIG. 13 is a two-dimensional graph on an origin at the center of the hole H1 plotting examples of the first waiting position changing at each time of the first insertion action and projected on the surface on the side into which the pin P1 of the substrate B is inserted when the first insertion action and the first separation action are performed at twice or more.

As shown in FIG. 13, a point PP0 indicating the first waiting position in the first-time first insertion action is located at the origin in the two-dimensional graph. Further, a point PP1 indicating the first waiting position in the second-time first insertion action is located at a point shifted in the positive direction of the X-axis and the positive direction of the Y-axis from the origin in the two-dimensional graph. Furthermore, a point PP2 indicating the first waiting position in the third-time first insertion action is located at a point shifted in the negative direction of the X-axis and the positive direction of the Y-axis from the point PP1 in the two-dimensional graph. In the two-dimensional graph shown in FIG. 13, twenty points indicating the first waiting positions are plotted. Note that the point PP20 is a point indicating the first waiting position in the 19th-time second insertion action. In this manner, the robot control part 48 changes the first waiting position along the helical trajectory based on the first waiting position information at each time of the first insertion action.

After the processing at step S150 is performed, the robot control part 48 starts the second insertion action (step S155). Here, referring to FIGS. 14 and 15, the states of the capacitor EP and the substrate B after the control point T2 is moved to the second waiting position in the first-time second insertion action at step S150 and the processing at step S155 are explained.

Figure 14:
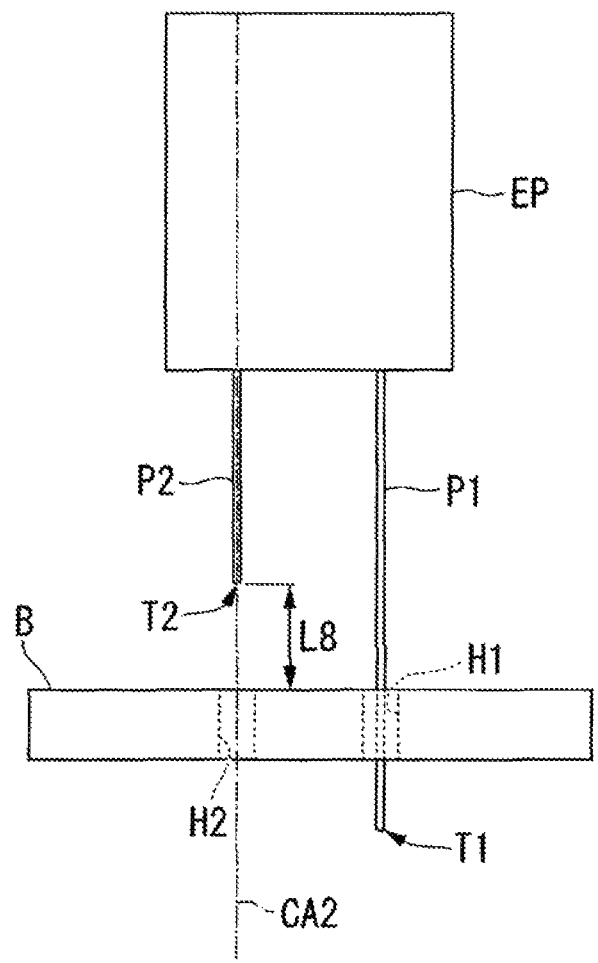
FIG. 14 shows an example of the state of the capacitor EP and the substrate B after a control point T2 is moved to a second waiting position in a first-time second insertion action at step S150.

FIG. 14 shows an example of the state of the capacitor EP and the substrate B after the control point T2 is moved to the second waiting position in the first-time second insertion action at step S150. As shown in FIG. 14, the second waiting position in the first-time second insertion action is a position at a distance L8 (in millimeters, for example) on a center axis CA2 of the hole H2 extending in a direction orthogonal to the surface on the side into which the pin P2 is inserted of the surfaces of the substrate B apart from the surface toward the capacitor EP. The distance L8 is e.g. 5 millimeters. Note that the distance L8 may be another distance instead.

Figure 15:
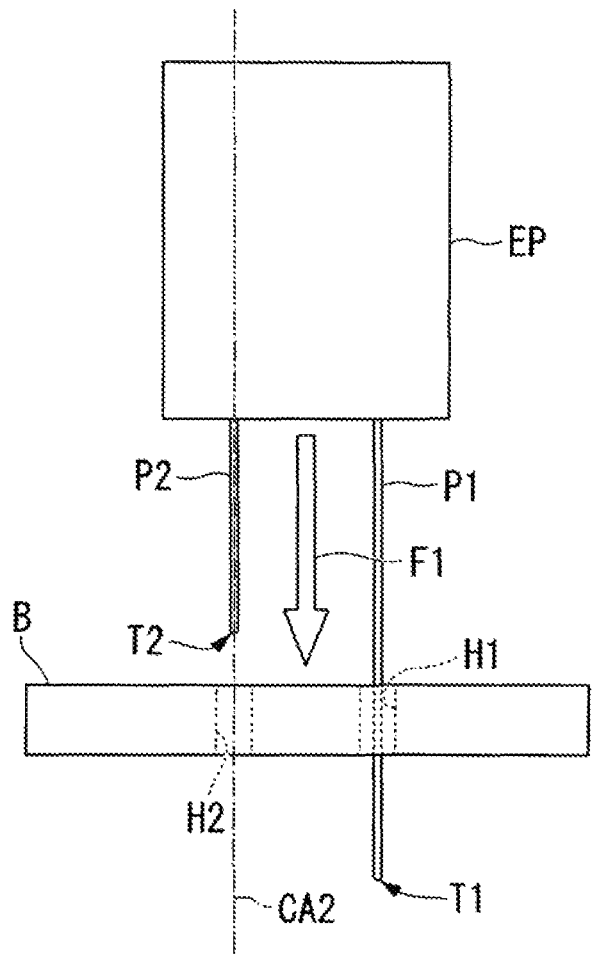
FIG. 15 shows an example of the state of the capacitor EP and the substrate B immediately after the second insertion action is started.

FIG. 15 shows an example of the state of the capacitor EP and the substrate B immediately after the second insertion action is started. As shown in FIG. 15, the robot control part 48 starts to move the capacitor EP along the first direction F1 in which the capacitor EP and the substrate B are closer to each other by the arm. As described above, the first direction F1 is the direction in which the capacitor EP and the substrate B are closer to each other along the center axis CA and the capacitor EP and the substrate B are closer to each other along the center axis CA2. Further, in the second insertion action, the robot control part 48 performs the second insertion action under the control based on the force detection information acquired from the force detection unit 21 by the force detection information acquisition part 40.

Then, the contact determination part 42 determines whether or not the capacitor EP (pin P2) has come into contact with a position different from the hole H2 in the second insertion action started from step S155 based on the force detection information acquired from the force detection unit 21 by the force detection information acquisition part 40 (step S160). If determining that a force applied to the pin P2 in the direction orthogonal to the surface of the capacitor EP with the pin P2 provided thereon is equal to or more than a predetermined second threshold value based on the force detection information acquired from the force detection unit 21, the contact determination part 42 determines that the capacitor EP (pin P2) has come into contact with a position different from the hole H2. The second threshold value is a force less than load with which the pin P2 buckles. On the other hand, if determining that the force applied to the pin P2 in the direction orthogonal to the surface of the capacitor EP with the pin P2 provided thereon is less than the predetermined second threshold value based on the force detection information acquired from the force detection unit 21, the contact determination part 42 determines that the capacitor EP (pin P2) has not come into contact with a position different from the hole H2. If the contact determination part 42 determines that the capacitor EP (pin P2) has not come into contact with a position different from the hole H2 (step S160—No), the robot control part 48 determines whether or not a second end condition as a condition for ending the second insertion action has been satisfied (step S165). Here, referring to FIG. 16, the second end condition is explained.

Figure 16:
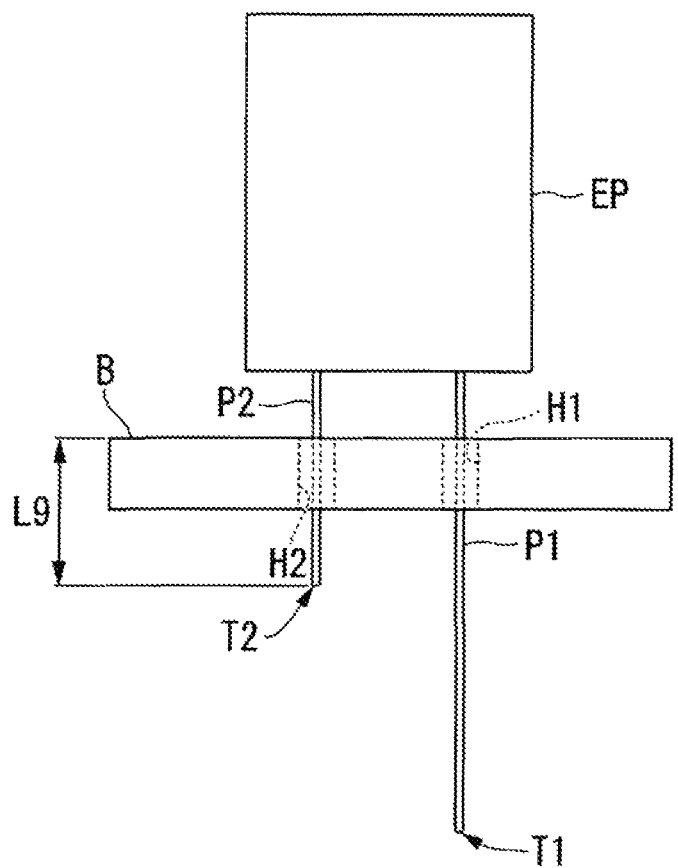
FIG. 16 shows an example of the state of the capacitor EP and the substrate B when a second end condition is satisfied.

FIG. 16 shows an example of the state of the capacitor EP and the substrate B when the second end condition is satisfied. In the example, the second end condition is that the position of the control point T2 on the above described center axis CA2 is apart at a distance L9 (in millimeters, for example) from the surface on the side into which the pin P2 is inserted of the surfaces of the substrate B in the first direction F1. In the example shown in FIG. 16, the position of the control point T2 on the center axis CA2 is apart at the distance L9 from the surface in the first direction F1. The distance L9 is e.g. 10 millimeters. Note that the distance L9 may be another distance instead. Further, the second end condition may be another condition instead.

At step S165, if the robot control part 48 determines that the second end condition is not satisfied (step S165—No), the contact determination part 42 transitions to step S160 and determines whether or not the capacitor EP (pin P2) has come into contact with a position different from the hole H2 again. On the other hand, if determining that the second end condition is satisfied (step S165—Yes), the robot control part 48 stops the movement of the control point T2 in the first direction F1 and ends the second insertion action. Then, the robot control part 48 allows the robot 20 to perform a third insertion action of moving the capacitor EP in the first direction F1 until the surface of the substrate B on the side into which the pin P1 and the pin P2 are inserted and the surface of the capacitor EP on which the pin P1 and the pin P2 are provided come into contact (step S170), allows a first end effector E1 to separate the capacitor EP, and then, moves the arm to a predetermined end position and ends the processing. Note that, at step S170, the robot control part 48 may be adapted to allow the robot 20 to perform a third insertion action of moving the capacitor EP in the first direction F1 until distances between a contact surface and the surface of the substrate B on the side into which the pin P1 and the pin P2 are inserted and the surface of the capacitor EP on which the pin P1 and the pin P2 are provided become equal to predetermined distances.

Figure 17:
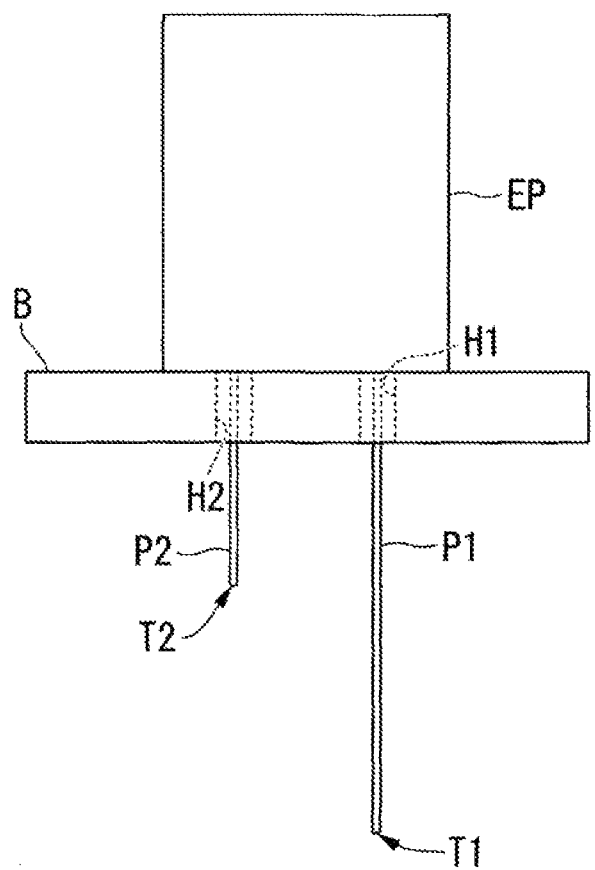
FIG. 17 shows an example of the state of the capacitor EP and the substrate B after a third insertion action is performed.

Here, referring to FIG. 17, the third insertion action at step S170 is explained. FIG. 17 shows an example of the state of the capacitor EP and the substrate B after the third insertion action is performed. As shown in FIG. 17, in the third insertion action, the robot control part 48 moves the capacitor EP in the first direction F1 until the surface of the substrate B on the side into which the pin P1 and the pin P2 are inserted and the surface of the capacitor EP on which the pin P1 and the pin P2 are provided come into contact. Thereby, the robot control part 48 may completely assemble the capacitor EP and the substrate B. Note that the third insertion action may be another action instead.

On the other hand, at step S160, if the contact determination part 42 determines that the capacitor EP (pin P2) has come into contact with a position different from the hole H2 (step S160—Yes), the robot control part 48 increments the execution sequence represented by the information representing the execution sequence of the second insertion action in the predetermined work by one. Then, the robot control part 48 specifies the second waiting position based on the position of the hole H2 represented by the position information read from the memory unit 32 by the position information reading part 44 at step 100, the second waiting position information read from the memory unit 32 by the waiting position information reading part 46 at step S110, and the information representing the execution sequence according to the execution sequence represented by the information. The robot control part 48 moves the capacitor EP in another direction than the opposite direction to the first direction of the directions in which the capacitor EP and the substrate B are farther from each other by the arm based on the specified second waiting position, and thereby, separates the capacitor EP and the substrate B and allows the robot 20 to perform the second separation action of moving the control point T2 to the second waiting position (step S190). After the second separation action is performed at step S190, the robot control part 48 transitions to step S150 and starts the second insertion action again. Here, referring to FIGS. 18 and 20, the states of the capacitor EP and the substrate B when the capacitor EP (pin P2) comes into contact with a position different from the hole H2 and the second separation action at step S190 are explained.

Figure 18:
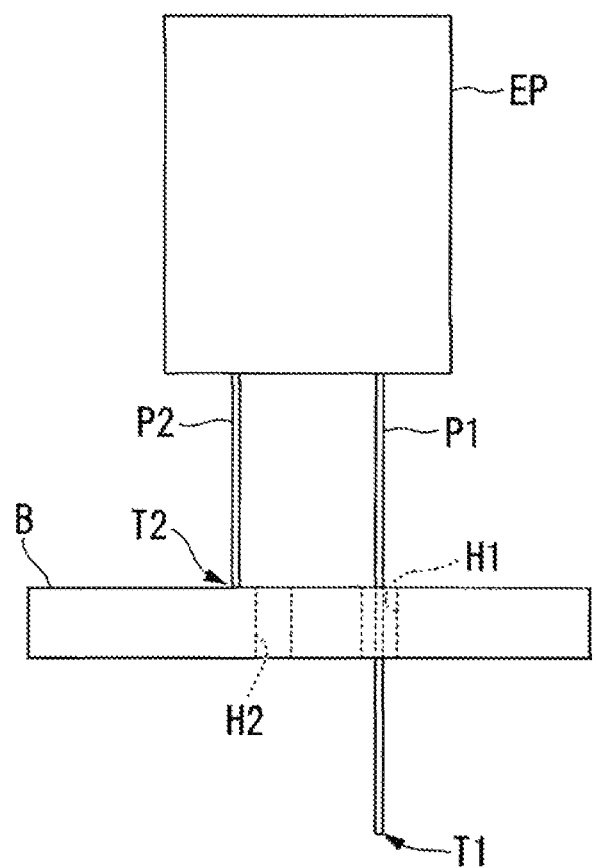
FIG. 18 shows an example of the state of the capacitor EP and the substrate B when the capacitor EP (pin P2) comes into contact with a position different from a hole H2.
Figure 19:
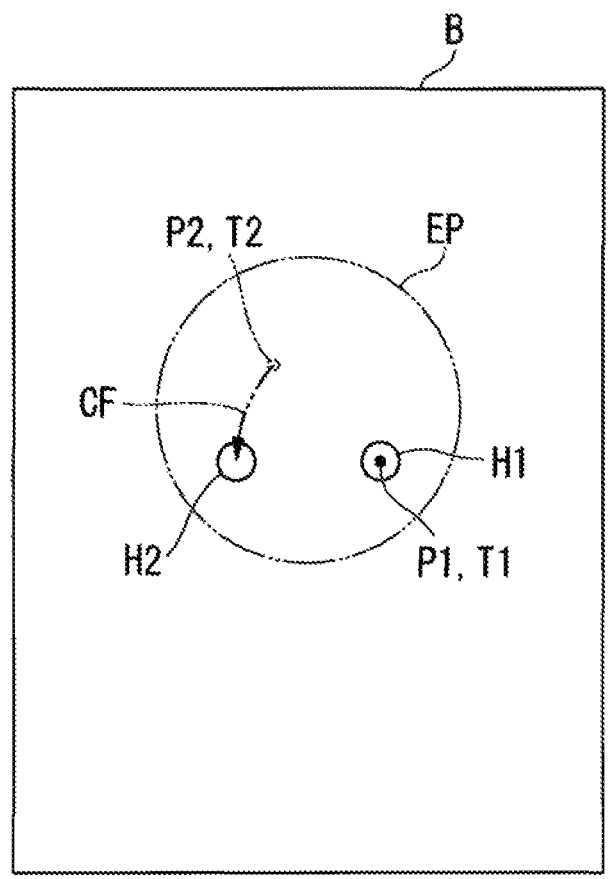
FIG. 19 is a bottom view of the capacitor EP and the substrate B in the state shown in FIG. 18 when a surface opposite to a side into which the pin P1 and the pin P2 are inserted of the surfaces of the substrate B is seen from a direction opposite to the first direction.

FIG. 18 shows an example of the state of the capacitor EP and the substrate B when the capacitor EP (pin P2) comes into contact with a position different from the hole H2. Even when the control point T2 is moved to the second waiting position in the first-time second insertion action at step S150, the pin P2 may come into contact with a position different from the hole H2 because of errors such as errors due to rigidity of the arm and errors with respect to the position in which the substrate B is provided. The state in FIG. 18 shows the example of the state in which the pin P2 has come into contact with a position different from the hole H2 because of the errors. In this case, as shown in FIG. 19, the robot control part 48 rotates the control point T2 around the pin P1 as a rotation axis, and thereby, may move the position of the control point T2 to a position in which the pin P2 may be inserted into the hole H2 by moving the capacitor EP in the first direction. FIG. 19 is a bottom view of the capacitor EP and the substrate B in the state shown in FIG. 18 when the surface opposite to the side into which the pin P1 and the pin P2 are inserted of the surfaces of the substrate B is seen from the direction opposite to the first direction. An arrow CF in FIG. 19 shows a trajectory of the control point T2 when the control point T2 is rotated around the pin P1 as the rotation axis. At step S160, if the contact determination part 42 determines that the capacitor EP (pin P2) has come into contact with a position different from the hole H2, the robot control part 48 performs the second separation action at step S190 as shown in FIG. 20.

Figure 20:
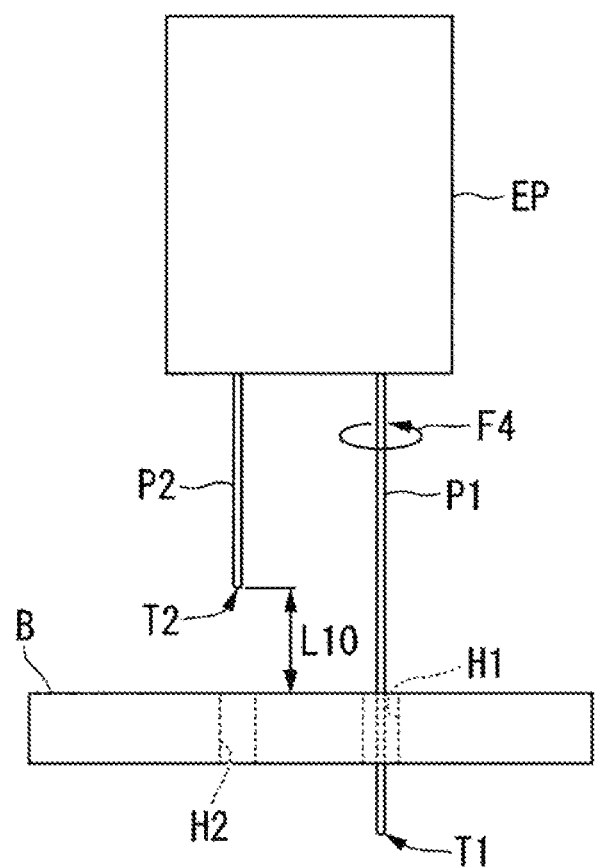
FIG. 20 shows an example of the state of the capacitor EP and the substrate B after a second separation action is performed.

FIG. 20 shows an example of the state of the capacitor EP and the substrate B after the second separation action is performed. As shown in FIG. 20, the robot control part 48 moves the control point T2 (i.e. capacitor EP) in another direction than the opposite direction (i.e. the direction along the center axis CA2) to the first direction of the directions in which the capacitor EP and the substrate B are farther from each other, and thereby, separates the capacitor EP and the substrate B and allows the robot 20 to perform the second separation action of moving the control point T2 to a second waiting position different from the previous second waiting position. For example, the robot control part 48 separates the capacitor EP from the substrate B to move the control point T2 in the opposite direction to the first direction F1 and rotates the control point T2 around the pin P1 as the rotation axis. An arrow F4 in FIG. 20 shows the direction of the rotation of the control point T2. The second waiting position is a position apart at the distance L10 from the surface on the side into which the pin P2 is inserted of the surfaces of the substrate B in the opposite direction to the first direction F1 as is the case of the second waiting position in the first-time second insertion action. However, after the second separation action, when the surface is seen in the first direction, a position in which the next (present) second waiting position is projected on the surface is a position different from the position in which the second waiting position in the previous second insertion action is projected on the surface. Note that, in the example shown in FIG. 20, after the second separation action is performed, when the surface is seen in the first direction F1, the position in which the second waiting position is projected on the surface coincides with the center of the hole H2 on the surface.

Further, in the second separation action, the robot control part 48 separates the capacitor EP and the substrate B by setting a trajectory of the movement from the position in which the control point T2 is in contact different from the hole H2 to a straight line and moving the control point T2 in another direction than the opposite direction to the first direction F1 of the directions in which the capacitor EP and the substrate B are farther from each other. Thereby, the robot control part 48 may shorten the period taken for moving the capacitor EP to a position to start moving the capacitor EP in the direction in which the capacitor EP and the substrate B are closer again (i.e., second waiting position) after separating the capacitor EP and the substrate B. Note that the robot control part 48 may be adapted to separate the capacitor EP and the substrate B by setting the trajectory of the movement from the position in which the control point T2 is in contact different from the hole H2 to another trajectory than the straight line and moving the control point T2 in another direction than the opposite direction to the first direction F1 of the directions in which the capacitor EP and the substrate B are farther from each other.

As described above, the robot control apparatus 30 may insert the pin P1 of the capacitor EP into the hole H1 of the substrate B and insert the pin P2 of the capacitor EP into the hole H2 of the substrate B while suppressing deformation of both the capacitor EP and the substrate B. Particularly, the pins like the pin P1 and the pin P2 of the capacitor EP in the example may buckle by application of a force of about four to five newtons. The robot control apparatus 30 may insert such a pin that is easy to break into a hole without buckling by the robot 20. Accordingly, the robot control apparatus 30 (or the robot 20 containing the robot control apparatus 30) may perform works without producing defective items in assembly plants of components and products and, as a result, work efficiency and productivity may be improved.

Here, according to the experiments of the inventors, when the robot 20 successfully inserts the pin P1 into the hole H1 without contact with a position different from the hole H1 and inserts the pin P2 into the hole H2 without contact with a position different from the hole H2, an average of periods taken by the robot 20 for inserting the pin P1 into the hole H1 and inserting the pin P2 into the hole H2 is 1.05 seconds. When the experiment is performed at a plurality of times, the periods taken by the robot 20 for inserting the pin P1 into the hole H1 and inserting the pin P2 into the hole H2 vary in the respective experiments. Accordingly, the average is an average of a plurality of experimental results obtained when the experiment is performed at the plurality of times.

Further, according to the experiments, when the robot 20 brings the pin P1 into contact with a position shifted by 0.8 millimeters from the hole H1 by the first-time first insertion action, an average of periods taken for inserting the pin P1 into the hole H1 and inserting the pin P2 into the hole H2 is 10.66 seconds. When the experiment is performed at a plurality of times, the number of the first insertion actions performed when the robot 20 brings the pin P1 into contact with a position shifted by 0.8 millimeters from the hole H1 by the first-time first insertion action and the number of fourth insertion actions vary in the respective experiments. Accordingly, the average is an average of a plurality of experimental results obtained when the experiment is performed at the plurality of times.

Note that, in the first embodiment, the force detection unit 21 may be adapted to initialize the force detected by the force detection unit 21 to zero before the first insertion action and the second insertion action are performed.

Or, the robot control apparatus 30 may be adapted to move the substrate B in the direction in which the capacitor EP and the substrate B are closer to each other by the arm, determines whether or not the capacitor EP (pin P1) has come into contact with a position different from the hole H1 of the substrate B based on the force detection information, and, if determining that the capacitor EP (pin P1) has come into contact with a position different from the hole H1 of the substrate B, separate the capacitor EP and the substrate B. In this case, the end effector E grasps the substrate B in place of the capacitor EP.

Or, in the case where the robot 20 is a dual-arm robot, the robot control apparatus 30 may be adapted to grasp the capacitor EP by an end effector of the first arm, grasp the substrate B by an end effector of the second arm, move the capacitor EP and the substrate B in the directions in which the capacitor EP and the substrate B are closer to each other by the two arms, determine whether or not the capacitor EP (pin P1) has come into contact with a position different from the hole H1 of the substrate B based on the force detection information, and, if determining that the capacitor EP (pin P1) has come into contact with a position different from the hole H1 of the substrate B, separate the capacitor EP and the substrate B.

Or, in the case where the robot system 1 or the robot 20 has an imaging unit, the robot control apparatus 30 may be adapted to capture a captured image containing the surface of the substrate B on the side into which the pin P1 and the pin P2 are inserted by the imaging unit, and detect the respective positions of the hole H1 and the hole H2 based on the captured image. In this case, it is not necessary to provide the position information reading part 44 in the control unit 36.

Or, in the case where the robot system 1 or the robot 20 has an imaging unit and the substrate B is moved in the direction in which the capacitor EP and the substrate B are closer to each other by the arm, the robot control apparatus 30 may be adapted to capture a captured image containing the pin P1 and the pin P2 of the capacitor EP by the imaging unit, and detect the respective positions of the control point T1 and the control point T2 based on the captured image.

Or, in the case where the robot system 1 or the robot 20 has an imaging unit, the robot 20 is a dual-arm robot, the capacitor EP is grasped by an end effector of the first arm, the substrate B is grasped by an end effector of the second arm, and the capacitor EP and the substrate B are moved in the directions in which the capacitor EP and the substrate B are closer to each other by the two arms, the robot control apparatus 30 may be adapted to capture captured images containing the pin P1 and the pin P2 of the capacitor EP and the hole H1 and the hole H2 of the substrate B by the imaging unit, and detect the positions of at least the control point T1 and the control point T2 or the hole H1 and the hole H2 based on the captured images.

Or, the combination of the first object and the second object may be any combination of two objects to be fitted in each other in place of the combination of the capacitor EP and the substrate B.

Second Embodiment

As below, the second embodiment of the invention will be explained with reference to the drawings. Note that the configuration of the robot 20 in the second embodiment is the same as the configuration of the robot 20 in the first embodiment and the explanation will be omitted.

Outline of Predetermined Work Performed by Robot

As below, an outline of a predetermined work performed by the robot 20 in the second embodiment will be explained.

Figure 21:
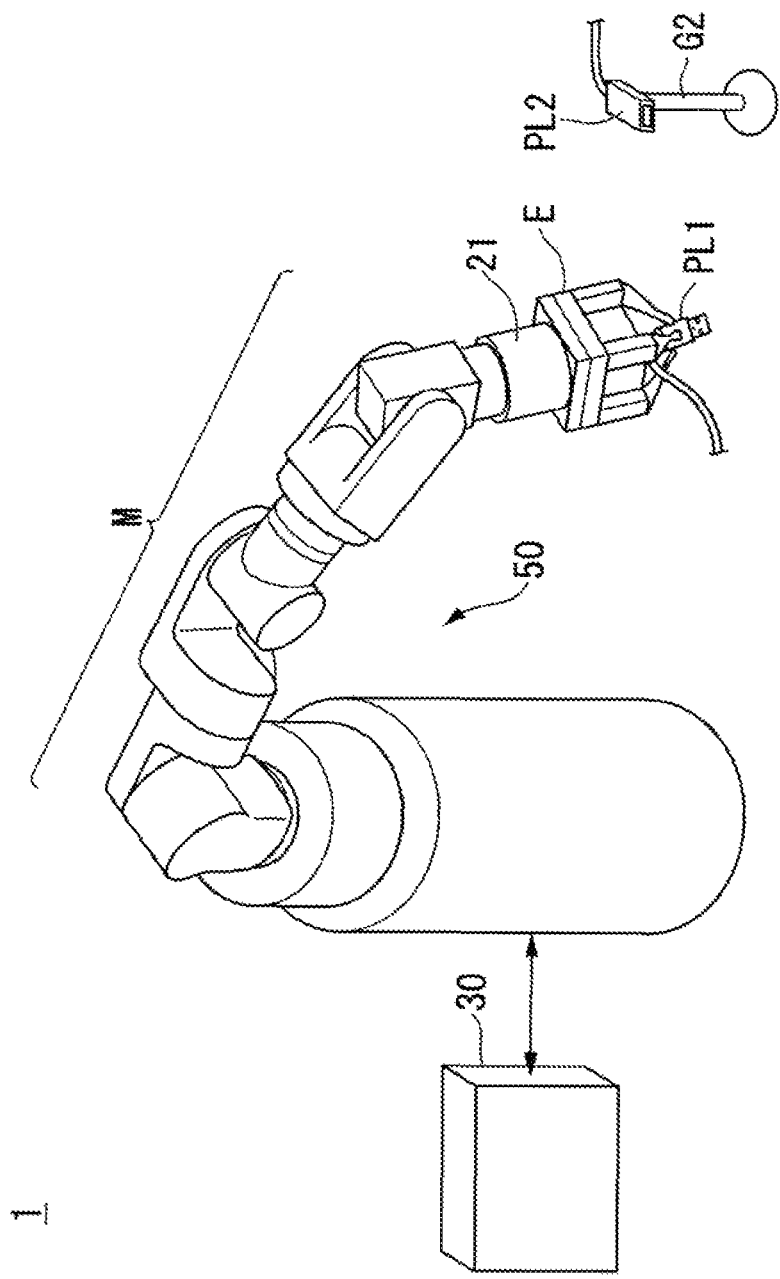
FIG. 21 shows an example of the configuration of the robot system 1 according to the second embodiment.

FIG. 21 shows an example of the configuration of the robot system 1 according to the second embodiment. In FIG. 21, the robot 20 in the second embodiment grasps a first object by an end effector E in advance like the robot 20 in the first embodiment. Note that the robot 20 may be adapted to grasp the first object placed in a predetermined feed region instead of grasping the first object in advance.

In the second embodiment, the case where the first object is a male connector (plug or jack) PL1 in a connecting cable for communications is explained. Note that the first object may be an industrial component, member, device, or the like or a living organism or the like in place of the connector PL1.

Further, in the second embodiment, the case where a second object is a female connector (receptacle) PL2 in a connecting cable for communications to be connected to the male connector as an example of the first object is explained. In FIG. 21, the connector PL2 is supported by a jig G2. Note that the second object may be an industrial component, member, device, or the like or a living organism or the like in place of the connector PL2. In FIG. 21, the connector PL2 is supported by the jig G2 provided on the contact surface of the robot 20 (e.g. floor surface), however, may be supported by the jig G2 provided in another position of a wall surface, a ceiling surface, or the like.

In the example, the robot 20 inserts the connector PL1 into an insertion portion PL21 of the connector PL2 as a predetermined work.

Outline of Processing Performed by Robot Control Apparatus

As below, an outline of processing performed by the robot control apparatus 30 for allowing the robot 20 to perform the predetermined work in the second embodiment will be explained.

As below, as an example, the case where the connector PL2 is supported by the jig G2 so that a positive direction of a Y-axis of a robot coordinate system as a three-dimensional coordinate system as reference when the robot control apparatus 30 moves the arm and a first direction F5 as a direction in which the connector PL1 is inserted into the insertion portion PL21 may be the same will be explained. That is, the opposite direction (first direction F5) to a direction in which the connector PL1 inserted into the insertion portion PL21 is pulled out from the insertion portion PL21 is the same as the positive direction of the Y-axis. Note that the connector PL2 may be supported by the jig G2 so that the direction in which the connector PL1 is inserted into the insertion portion PL21 may be the same as another direction.

Further, in the example, at the center of the end of the connector PL1, a control point T3 as a TCP moving with the center is set. The end of the connector PL1 is an end on the side to be inserted into the insertion portion PL21 of the ends of the connector PL1. The end of the connector PL1 has a surface orthogonal to the first direction F5 when the connector PL1 is inserted into the insertion portion PL21 of the connector PL2 supported by the jig G2. The shape of the surface is e.g. a rectangular shape. That is, the center of the end of the connector PL1 in the example is the center of the rectangle.

A three-dimensional local coordinate system representing the position and the attitude of the connector PL1 is set for the control point T3. The origin of the three-dimensional local coordinate system indicates the position of the control point T3, i.e., the center of the end of the connector PL1. Further, directions of the respective coordinate axes of the three-dimensional local coordinate system indicate the attitude of the control point T3, i.e., the center of the end of the connector PL1. For example, at the control point T3, the three-dimensional local coordinate system is set so that the positive direction of the Z-axis of the three-dimensional local coordinate system may be the same as the positive direction of the Y-axis of the robot coordinate system when the connector PL1 is inserted into the insertion portion PL21.

The robot control apparatus 30 moves the connector PL1 by the arm based on position information as information representing the position of the insertion portion PL21 of the connector PL2 stored in the memory unit 32 in advance, and thereby, moves the control point T3 of the connector PL1 to a third waiting position as a predetermined waiting position and sets the attitude of the control point T3 to a predetermined waiting attitude. The third waiting position is a position indicating the start point of the control point T3 in a fourth insertion action as an action of moving the connector PL1 closer to the connector PL2 of the actions that the robot control apparatus 30 allows the robot 20 to perform in the predetermined work. Further, in the example, the predetermined waiting attitude is an attitude in which the positive direction of the Z-axis of the three-dimensional local coordinate system set for the control point T3 is the same as the positive direction of the Y-axis of the robot coordinate system.

In the example, the position of the insertion portion PL21 is indicated by the position of the center of the end of the insertion portion PL21. The end of the insertion portion PL21 is an end on the side into which the connector PL1 is inserted of the ends of the insertion portion PL21. The end of the insertion portion PL21 has a surface orthogonal to the first direction F5 when the connector is supported by the jig G2. The shape of the surface is e.g. a rectangular shape. That is, the center of the end of the insertion portion PL21 in the example is the center of the rectangle. Note that the position of the insertion portion PL21 may be another position associated with the center of the figure instead.

The position information as information representing the position of the insertion portion PL21 of the connector PL2 stored in the memory unit 32 in advance may be information representing a relative position from a reference position as a position of reference to the position of the insertion portion PL21 in place of the information representing the position of the insertion portion PL21. For example, in the case where the robot 20 is installed on a pedestal and the pedestal on which the robot 20 is installed and a pedestal on which the jig G2 supporting the connector PL2 is installed are different, the position of the insertion portion PL21 represented by the position information stored in the robot control apparatus 30 in advance and the present position of the insertion portion PL21 may be different due to vibration or the like. Further, in the case where teaching of storing the position of the insertion portion PL21 is performed on the robot control apparatus 30, it may be impossible to perform the teaching because of the existence of another interfering object around or the like.

In this case, a reference position is provided on the pedestal on which the jig G2 is installed, the information representing the relative position from the reference position to the insertion portion PL21 is stored in the robot control apparatus 30 in advance, and thereby, the robot control apparatus 30 may perform the predetermined work by storing only the reference position again. As a result, a user may allow the robot control apparatus 30 to perform the predetermined work without storing the position of the insertion portion PL21.

The robot control apparatus 30 moves the control point T3 to the third waiting position as the start point in the fourth insertion action by the arm, then, allows the robot 20 to perform the fourth insertion action, and thereby, starts to move the connector PL1 closer to the connector PL2. Specifically, the robot control apparatus 30 starts to move the connector PL1 in the first direction F5 in which the connector PL1 and the connector PL2 are closer to each other by the arm. During the fourth insertion action, the robot control apparatus 30 repeats determination as to whether or not the connector PL1 has come into contact with a position different from the insertion portion PL21 based on the force detection information. The robot control apparatus 30 allows the robot 20 to keep on continuing the fourth insertion action as long as the determination that the connector PL1 is not in contact with a position different from the insertion portion PL21 is maintained. Then, the robot control apparatus 30 inserts the connector PL1 into the insertion portion PL21 by the arm.

On the other hand, if determining that the connector PL1 has come into contact with a position different from the insertion portion PL21 based on the force detection information during the fourth insertion action, the robot control apparatus 30 separates the connector PL1 and the connector PL2 by the arm. Thereby, the robot control apparatus 30 may suppress deformation of the connector PL1 and the connector PL2 when the connector PL1 comes into contact with a position different from the insertion portion PL21 of the connector PL2.

Further, when separating the connector PL1 and the connector PL2, the robot control apparatus 30 sets a position different from the third waiting position at the time immediately before of the previous times when the control point T3 waits in the third waiting position as a new third waiting position, and moves the control point T3 to the third waiting position. Thereby, the robot control apparatus 30 separates the connector PL1 and the connector PL2 and changes the relative position relationship between the previous third waiting position and the insertion portion PL21 to a new relative position relationship between the new third waiting position and the insertion portion PL21. That is, the robot control apparatus 30 separates the connector PL1 and the connector PL2 and changes the start point of the control point T3 in the fourth insertion action to a start position different from the previous start point at each time when separating the connector PL1 and the connector PL2. Then, the robot control apparatus 30 allows the robot 20 to perform the fourth insertion action again, and thereby, moves the connector PL1 closer to the connector PL2.

As described above, even when the robot control apparatus 30 determines that the connector PL1 has come into contact with a position different from the insertion portion PL21 based on the force detection information, the movement of the connector PL1 closer to the connector PL2 and the separation of the connector PL1 from the connector PL2 are repeated, and thereby, the connector PL1 may be inserted into the insertion portion PL21 while deformation of one or both of the connector PL1 and the connector PL2 is suppressed.

In the second embodiment, processing of separating the connector PL1 and the connector PL2 by the robot control apparatus 30 if the determination that the connector PL1 has come into contact with a position different from the insertion portion PL21 is made based on the force detection information is explained in detail.

Specific Examples of Standards of Connectors

As below, referring to FIG. 22, specific examples of standards of the connector PL1 and the connector PL2 will be explained. FIG. 22 shows the specific examples of the standards of the connector PL1 and the connector PL2. As shown in FIG. 22, the standards of the connector PL1 and the connector PL2 are e.g. USB Type-A and HDMI (High-Definition Multimedia Interface, registered trademark).

When the standard of the connector PL1 and the connector PL2 is USB Type-A, pressure necessary for insertion of the connector PL1 into the insertion portion PL21 of the connector PL2 is e.g. 10 to 15 newtons. Further, grasping pressure as pressure necessary for the end effector E to grasp the connector PL1 for generating that pressure is e.g. 10.3 newtons.

Alternatively, when the standard of the connector PL1 and the connector PL2 is HDMI (registered trademark), pressure necessary for insertion of the connector PL1 into the insertion portion PL21 of the connector PL2 is e.g. 40 to 45 newtons. Further, grasping pressure as pressure necessary for the end effector E to grasp the connector PL1 for generating that pressure is e.g. 14 newtons.

Note that the standard of the connector PL1 and the connector PL2 may be another standard in place of the USB Type-A and HDMI (registered trademark).

Hardware Configuration and Functional Configuration of Robot Control Apparatus

The hardware configuration and the functional configuration of the robot control apparatus 30 in the second embodiment are the same as the hardware configuration and the functional configuration of the robot control apparatus 30 in the first embodiment, and the explanation will be omitted.

Figure 23:
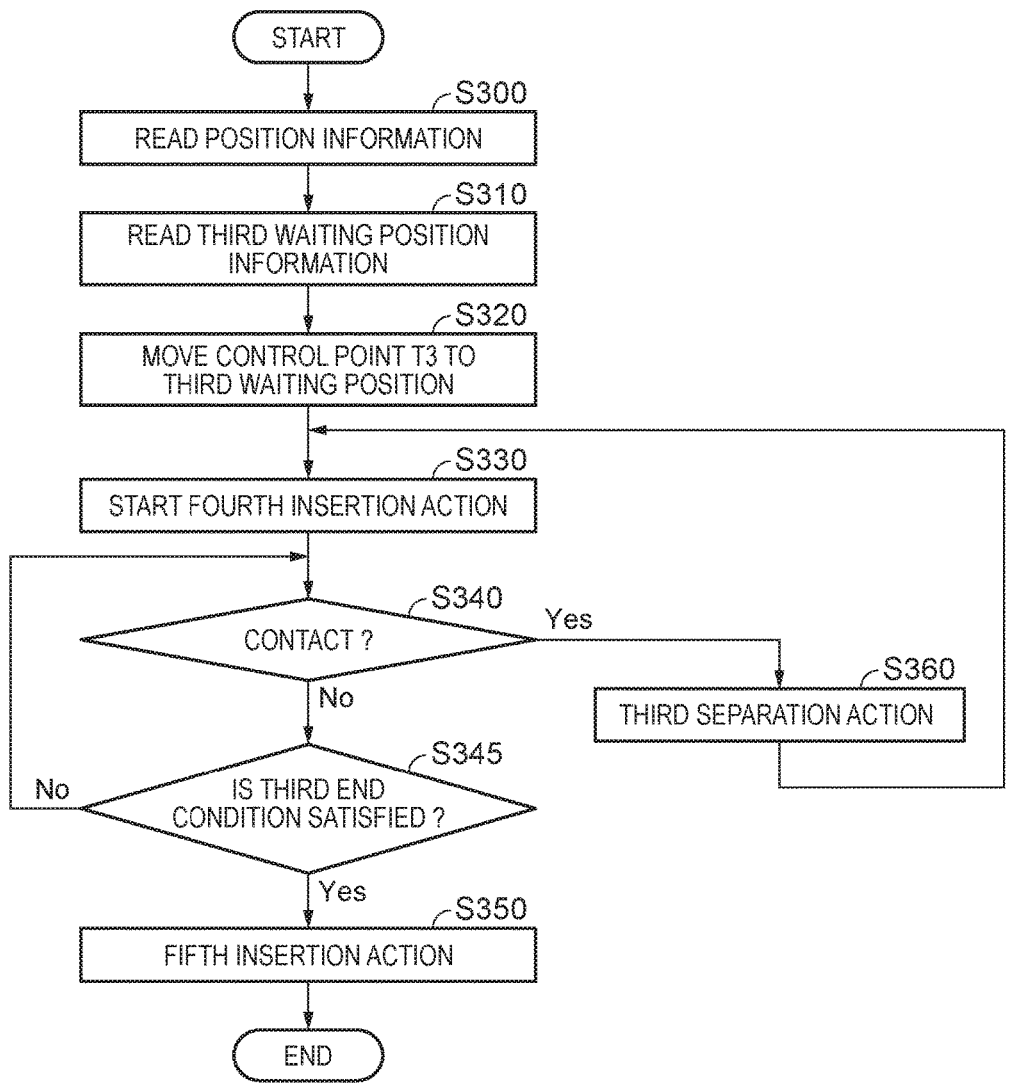
FIG. 23 is a flowchart showing an example of a flow of processing of allowing the robot 20 to perform a predetermined work by the robot control apparatus 30 in the second embodiment.

Processing of Allowing Robot to Perform Predetermined Work by Robot Control Apparatus As below, processing of allowing the robot 20 to perform the predetermined work by the robot control apparatus 30 in the second embodiment will be explained with reference to FIG. 23. FIG. 23 is a flowchart showing an example of a flow of the processing of allowing the robot 20 to perform the predetermined work by the robot control apparatus 30 in the second embodiment.

The position information reading part 44 reads the position information from the memory unit 32 (step S300). Then, the waiting position information reading part 46 reads the third waiting position information stored in the memory unit 32 in advance from the memory unit 32 (step S310). Here, the third waiting position information is explained. The third waiting position information includes information in which information representing the relative position from the third waiting position to the position of the insertion portion PL21 and information representing the execution sequence of the fourth insertion action repeatedly performed in the predetermined work by the robot 20 are associated with each other. For example, when the execution sequence is zero, information representing the position associated with the information representing the execution sequence as the relative position from the third waiting position to the position of the insertion portion PL21 is information representing the position in the first-time fourth insertion action as the relative position from the third waiting position to the insertion portion PL21. Further, when the execution sequence is one, information representing the position associated with the information representing the execution sequence as the relative position from the third waiting position to the position of the insertion portion PL21 is information representing the position in the second-time fourth insertion action as the relative position from the third waiting position to the position of the insertion portion PL21. That is, the robot control apparatus 30 specifies a third waiting position according to the execution sequence of the fourth insertion action and moves the control point T3 to the third waiting position at each time when allowing the robot 20 to perform the fourth insertion action based on the position of the insertion portion PL21 represented by the position information and the third waiting position information.

Then, the robot control part 48 operates the arm, moves the control point T3 to the first-time third waiting position, and sets the attitude of the control point T3 in the third waiting position to align with the predetermined waiting attitude based on the position of the insertion portion PL21 represented by the position information read from the memory unit 32 by the position information reading part 44 at step S300 and the third waiting position information read from the memory unit 32 by the waiting position information reading part 46 at step S310 (step S320). Then, the robot control part 48 performs initialization so that the information representing the execution sequence of the fourth insertion action may represent zero and stores the information. Here, referring to FIG. 24, the processing at step S320 is explained.

Figure 24:
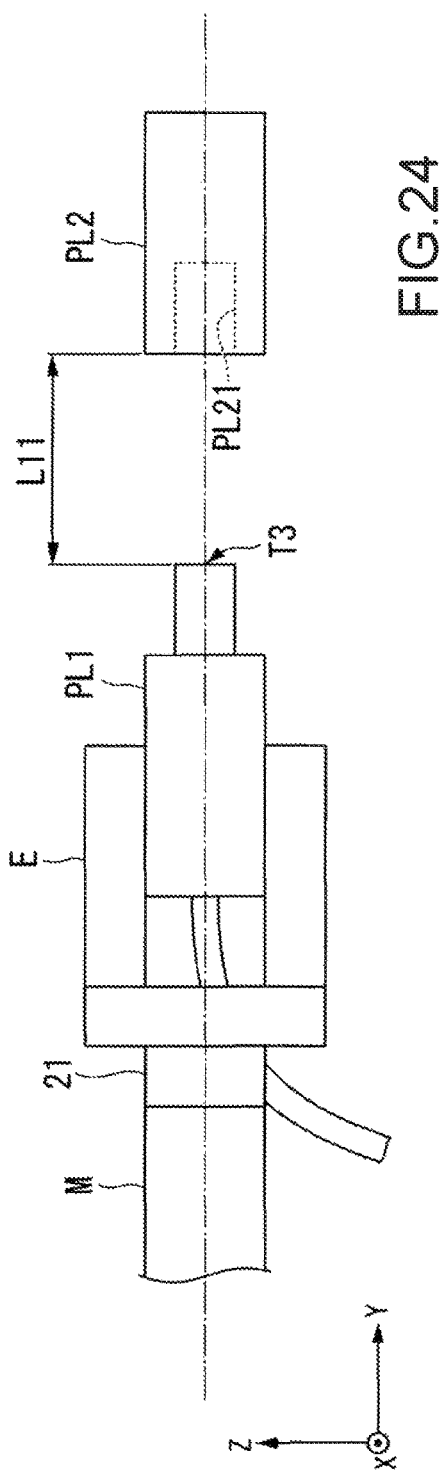
FIG. 24 shows an example of a state of the connector PL1 and the connector PL2 when a control point T3 moves to a third waiting position in a first-time fourth insertion action.

FIG. 24 shows an example of a state of the connector PL1 and the connector PL2 when the control point T3 moves to the third waiting position in the first-time fourth insertion action. The three-dimensional coordinate system shown in FIG. 24 is the above described robot coordinate system. As shown in FIG. 24, the third waiting position in the first-time fourth insertion action is a position apart at a distance L11 (in millimeters, for example) from the surface of the end of the insertion portion PL21 in the negative direction of the Y-axis of the robot coordinate system when the attitude of the connector PL1 is the predetermined attitude. The distance L11 is e.g. 10 millimeters. Note that the distance L11 may be another distance instead.

Figure 25:
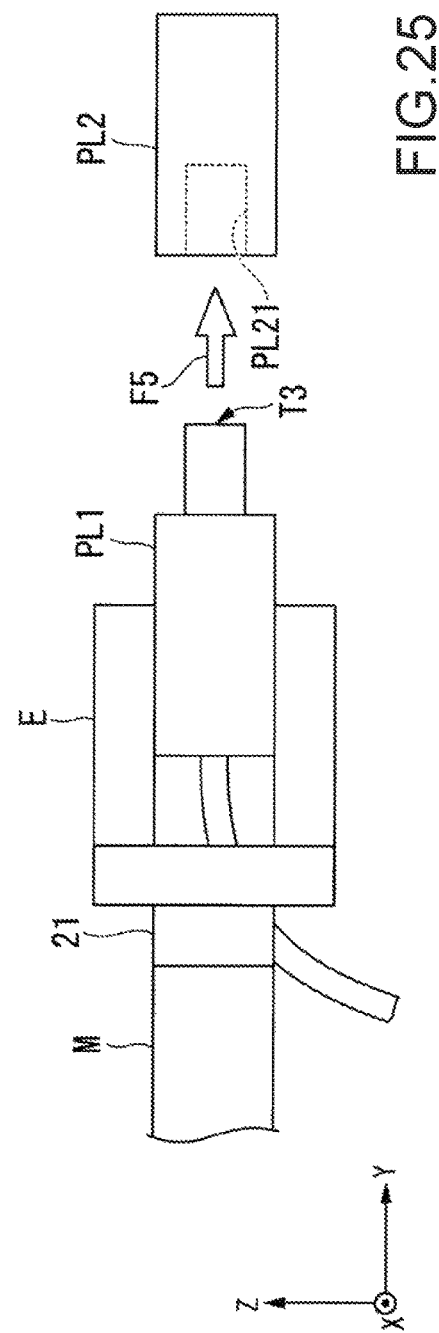
FIG. 25 shows an example of the state of the connector PL1 and the connector PL2 immediately after the fourth insertion action is started.

Then, the robot control part 48 allows the robot 20 to start the fourth insertion action (step S330). Here, referring to FIG. 25, the processing at step S330 is explained. FIG. 25 shows an example of the state of the connector PL1 and the connector PL2 immediately after the fourth insertion action is started. The three-dimensional coordinate system shown in FIG. 25 is the above described robot coordinate system. As shown in FIG. 25, the robot control part 48 starts to move the connector PL1 in the first direction F5 in which the connector PL1 and the connector PL2 are closer to each other by the arm. As described above, in the example, the first direction F5 is the positive direction of the Y-axis of the robot coordinate system. Further, in the fourth insertion action, the robot control part 48 performs the fourth insertion action under the control based on the force detection information acquired from the force detection unit 21 by the force detection information acquisition part 40.

Then, the contact determination part 42 determines whether or not the connector PL1 has come into contact with a position different from the insertion portion PL21 in the fourth insertion action started from step S330 based on the force detection information acquired from the force detection unit 21 by the force detection information acquisition part 40 (step S340). If determining that a force applied to the connector PL1 in the opposite direction to the first direction F5 is equal to or more than a predetermined third threshold value based on the force detection information acquired from the force detection unit 21, the contact determination part 42 determines that the connector PL1 has come into contact with a position different from the insertion portion PL21. The third threshold value is a force larger than the minimum force necessary when the connector PL1 is inserted into the insertion portion PL21 (e.g. necessary insertion pressure shown in FIG. 22). For example, when the standard of the connector PL1 and the connector PL2 is USB Type-A shown in FIG. 22, the third threshold value is a force larger than 10 newtons. On the other hand, if determining that the force applied to the connector PL1 in the opposite direction to the first direction F5 is less than the predetermined third threshold value based on the force detection information acquired from the force detection unit 21, the contact determination part 42 determines that the connector PL1 has not come into contact with a position different from the insertion portion PL21. If the contact determination part 42 determines that the connector PL1 has not come into contact with a position different from the insertion portion PL21 (step S340—No), the robot control part 48 determines whether or not a third end condition as a condition for ending the fourth insertion action has been satisfied (step S345). Here, referring to FIG. 26, the third end condition is explained.

Figure 26:
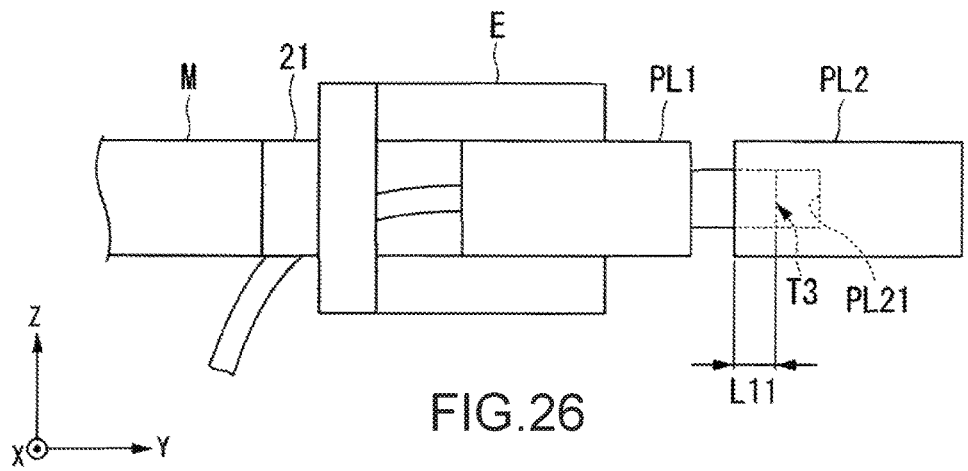
FIG. 26 shows an example of the state of the connector PL1 and the connector PL2 when a third end condition is satisfied.

FIG. 26 shows an example of the state of the connector PL1 and the connector PL2 when the third end condition is satisfied. The three-dimensional coordinate system shown in FIG. 26 is the above described robot coordinate system. In the example, the third end condition is that the position of the control point T3 in the direction along the Y-axis in the robot coordinate system is apart at the distance L11 (in millimeters, for example) from the surface of the end of the insertion portion PL21 in the first direction F5. In the example shown in FIG. 26, the position of the control point T3 is apart at the distance L11 from the surface in the first direction F5 along the Y-axis. The distance L11 is e.g. 5 millimeters. Note that the distance L11 may be another distance instead. Further, the third end condition may be another condition instead.

At step S345, if the robot control part 48 determines that the third end condition is not satisfied (step S345—No), the contact determination part 42 transitions to step S340 and determines whether or not the connector PL1 has come into contact with a position different from the insertion portion PL21 again. On the other hand, if determining that the third end condition is satisfied (step S345—Yes), the robot control part 48 stops the movement of the control point T3 in the first direction F5 and ends the fourth insertion action. Then, the robot control part 48 allows the robot 20 to perform a fifth insertion action of moving the connector PL1 in the first direction F5 until the connector PL1 is completely inserted into the connector PL2 (step S350) and allows the end effector E to release the connector PL1, and then, moves the arm to a predetermined end position and ends the processing. Here, referring to FIG. 27, the fifth insertion action at step S350 is explained.

Figure 27:
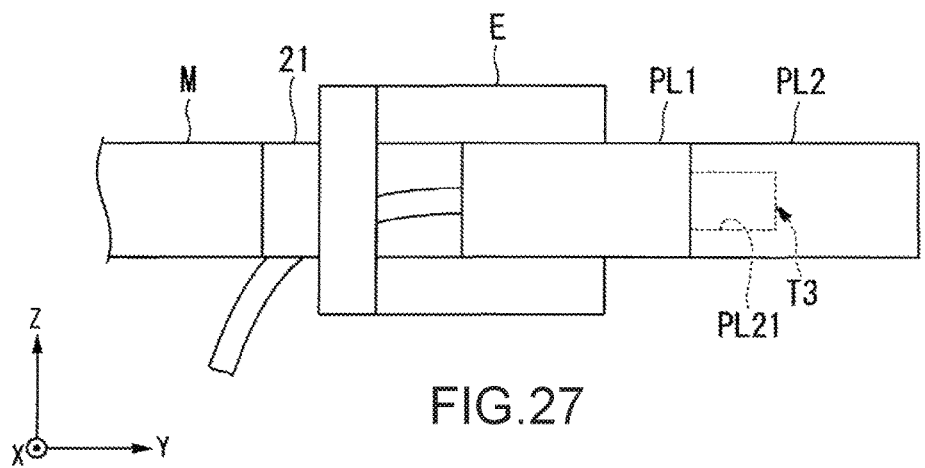
FIG. 27 shows an example of the state of the connector PL1 and the connector PL2 after a fifth insertion action is performed.

FIG. 27 shows an example of the state of the connector PL1 and the connector PL2 after the fifth insertion action is performed. The three-dimensional coordinate system shown in FIG. 27 is the above described robot coordinate system.

As shown in FIG. 27, in the fifth insertion action, the robot control part 48 moves the connector PL1 in the first direction F5 until the connector PL1 is completely inserted into the connector PL2 by the arm. Thereby, the robot control part 48 may completely connect the connector PL1 and the connector PL2. Note that the fifth insertion action may be another action instead.

On the other hand, at step S340, if the contact determination part 42 determines that the connector PL1 has come into contact with a position different from the insertion portion PL21 (step S340—Yes), the robot control part 48 increments the execution sequence represented by the information representing the execution sequence of the fourth insertion action in the predetermined work by one. Then, the robot control part 48 specifies the third waiting position according to the number of the fourth insertion actions based on the position of the insertion portion PL21 represented by the position information read from the memory unit 32 by the position information reading part 44 at step 300, the third waiting position information read from the memory unit 32 by the waiting position information reading part 46 at step S310, and the information representing the execution sequence. The robot control part 48 moves the connector PL1 in another direction than the opposite direction (in the example, the negative direction of the Y-axis of the robot coordinate system) to the first direction F5 of the directions in which the connector PL1 and the connector PL2 are farther from each other based on the specified third waiting position by the arm, and thereby, separates the connector PL1 and the connector PL2 and allows the robot 20 to perform a third separation action of moving the control point T3 to the third waiting position (step S360). After the third separation action is performed at step S360, the robot control part 48 transitions to step S330 and starts the fourth insertion action again. Here, referring to FIGS. 28 and 29, the states of the connector PL1 and the connector PL2 when the connector PL1 comes into contact with a position different from the insertion portion PL21 and the third separation action at step S360 are explained.

Figure 28:
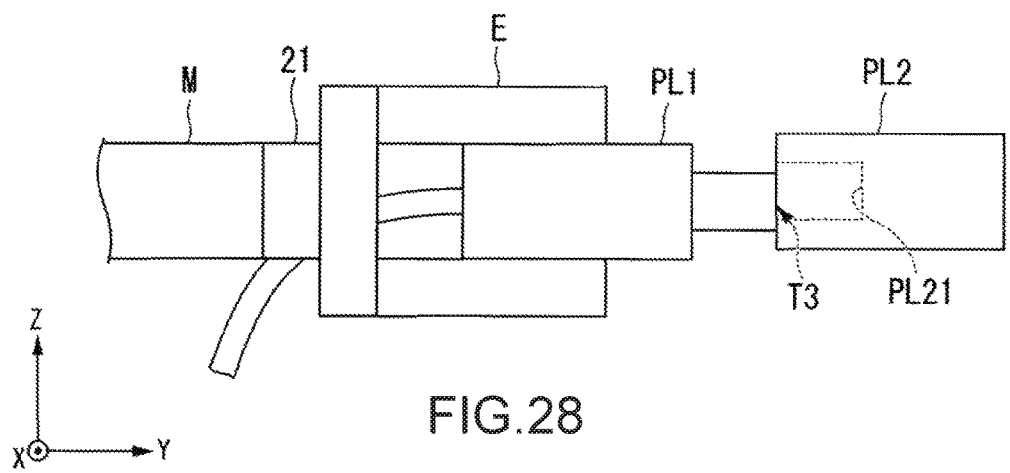
FIG. 28 shows an example of the state of the connector PL1 and the connector PL2 when the connector PL1 comes into contact with a position different from an insertion portion PL21.

FIG. 28 shows an example of the state of the connector PL1 and the connector PL2 when the connector PL1 comes into contact with a position different from the insertion portion PL21. Even when the control point T3 is moved to the third waiting position in the first-time fourth insertion action at step S320, the connector PL1 may come into contact with a position different from the insertion portion PL21 because of errors such as errors due to rigidity of the arm and errors with respect to the position in which the connector PL2 is provided. The state in FIG. 28 shows the example of the state in which the connector PL1 has come into contact with a position different from the insertion portion PL21 because of the errors. At step S340, if the contact determination part 42 determines that the connector PL1 has come into contact with a position different from the insertion portion PL21, the robot control part 48 performs the third separation action at step S360 as shown in FIG. 29.

Figure 29:
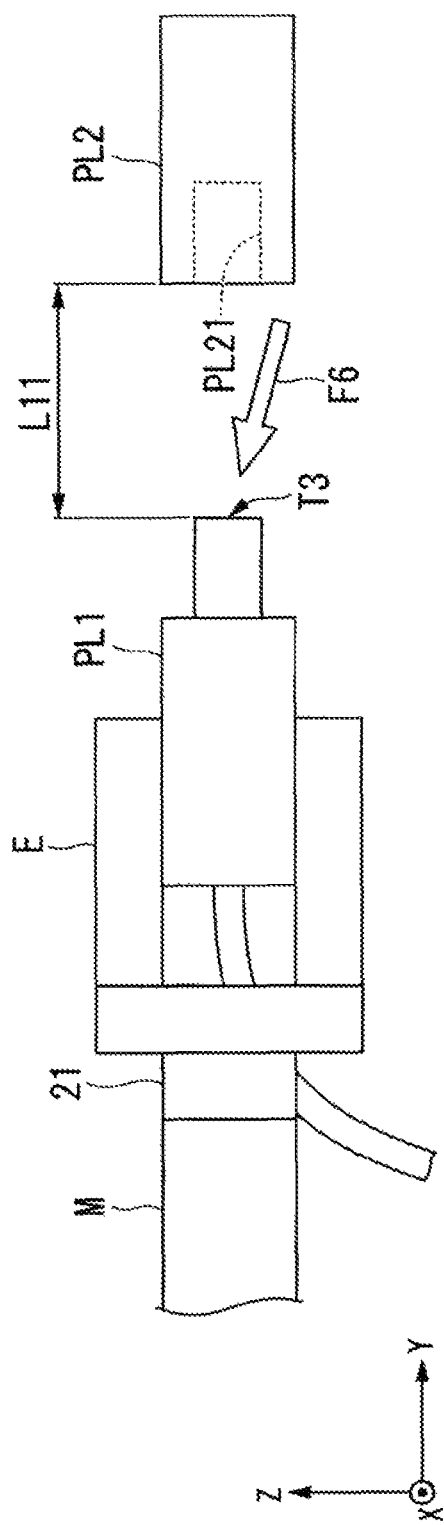
FIG. 29 shows an example of the state of the connector PL1 and the connector PL2 after a third separation action is performed.

FIG. 29 shows an example of the state of the connector PL1 and the connector PL2 after the third separation action is performed. As shown in FIG. 29, the robot control part 48 moves the control point T3 (i.e. connector PL1) in another direction F6 than the opposite direction (in the example, the negative direction of the Y-axis of the robot coordinate system) to the first direction F5 of the directions in which the connector PL1 and the connector PL2 are farther from each other, and thereby, separates the connector PL1 and the connector PL2 and allows the robot 20 to perform the third separation action of moving the control point T3 to a third waiting position different from the previous third waiting position. The third waiting position is a position apart at the distance L11 from the surface of the end of the insertion portion PL21 in the opposite direction to the first direction F5 along the Y-axis of the robot coordinate system as is the case of the third waiting position in the first-time fourth insertion action. However, after the third separation action, when the surface is seen in the first direction F5, a position in which the third waiting position is projected on the surface is a position different from the position in which the third waiting position in the first-time fourth insertion action is projected on the surface.

Further, in the third separation action, the robot control part 48 separates the connector PL1 and the connector PL2 by setting a trajectory of the movement from the position in which the control point T3 is in contact different from the insertion portion PL21 to a straight line and moving the control point T3 in another direction than the opposite direction to the first direction F5 of the directions in which the connector PL1 and the connector PL2 are farther from each other. Thereby, the robot control part 48 may shorten the period taken for moving the connector PL1 to a position to start moving the connector PL1 in the direction in which the connector PL1 and the connector PL2 are closer to each other again (i.e., third waiting position) after separating the connector PL1 and the connector PL2. Note that the robot control part 48 may be adapted to separate the connector PL1 and the connector PL2 by setting the trajectory of the movement from the position in which the control point T3 is in contact different from the insertion portion PL21 to another trajectory than the straight line and moving the control point T3 in another direction than the opposite direction to the first direction F5 of the directions in which the connector PL1 and the connector PL2 are farther from each other in the third separation action.

Furthermore, in the example, when the fourth insertion action and the third separation action are performed at twice or more, that is, when the contact of the connector PL1 with a position different from the insertion portion PL21 and the separation of the connector PL1 and the connector PL2 are performed at twice or more, the robot control part 48 changes the third waiting position along a helical trajectory based on the third waiting position information as shown in FIG. 13. The processing of helically moving the control point T3 is the same as the processing of helically moving the control point T1 in FIG. 13, and the explanation will be omitted.

Note that, in the second embodiment, the force detection unit 21 may be adapted to initialize the force detected by the force detection unit 21 to zero before the fourth insertion action is performed.

The robot control apparatus 30 may be adapted to set upper limits for the numbers of times of execution of one or both of the first separation action and the second separation action in the first embodiment. For example, the robot control apparatus 30 may be adapted, in the case where the upper limit for the number of times of execution of the first separation action is three, when the fourth-time first separation action is to be executed, not to execute the first separation action and to allow the display unit 35 to display an error.

Further, the robot control apparatus 30 may be adapted to set an upper limit for the number of times of execution of the third separation action in the second embodiment. For example, the robot control apparatus 30 may be adapted, in the case where the upper limit for the number of times of execution of the third separation action is three, when the fourth-time third separation action is to be executed, not to execute the third separation action and to allow the display unit 35 to display an error.

As described above, the robot control apparatus 30 may insert the connector PL1 into the insertion portion PL21 while suppressing deformation of both the connector PL1 and the connector PL2. Accordingly, the robot control apparatus 30 (or the robot 20 containing the robot control apparatus 30) may perform works without producing defective items in assembly plants of components and products and, as a result, work efficiency and productivity may be improved.

Note that the robot control apparatus 30 may be adapted to move the connector PL2 in the direction in which the connector PL1 and the connector PL2 are closer to each other by the arm, determine whether or not the connector PL1 has come into contact with a position different from the insertion portion PL21 based on the force detection information, and, if determining that the connector PL1 has come into contact with a position different from the insertion portion PL21, separate the connector PL1 and the connector PL2. In this case, the end effector E grasps the connector PL2 in place of the connector PL1.

Or, in the case where the robot 20 is a dual-arm robot, the robot control apparatus 30 may be adapted to grasp the connector PL1 by an end effector of the first arm, grasp the connector PL2 by an end effector of the second arm, move the connector PL1 and the connector PL2 in the directions in which the connector PL1 and the connector PL2 are closer to each other by the two arms, determine whether or not the connector PL1 has come into contact with a position different from the insertion portion PL21 based on the force detection information, and, if determining that the connector PL1 has come into contact with a position different from the insertion portion PL21, separate the connector PL1 and the connector PL2.

Or, in the case where the robot system 1 or the robot 20 has an imaging unit, the robot control apparatus 30 may be adapted to capture a captured image containing the surface of the end of the insertion portion PL21 by the imaging unit, and detect the position of the insertion portion PL21 based on the captured image. In this case, it is not necessary to provide the position information reading part 44 in the control unit 36.

Or, in the case where the robot system 1 or the robot 20 has an imaging unit and the connector PL2 is moved in the direction in which the connector PL1 and the connector PL2 are closer to each other by the arm, the robot control apparatus 30 may be adapted to capture a captured image containing the surface of the end of the connector PL1 by the imaging unit, and detect the position of the control point T3 based on the captured image.

Or, in the case where the robot system 1 or the robot 20 has an imaging unit, the robot 20 is a dual-arm robot, the connector PL1 is grasped by an end effector of the first arm, the connector PL2 is grasped by an end effector of the second arm, and the connector PL1 and the connector PL2 are moved in the directions in which the connector PL1 and the connector PL2 are closer to each other by the two arms, the robot control apparatus 30 may be adapted to capture captured images containing the surface of the end of the connector PL1 and the surface of the end of the insertion portion PL21 by the imaging unit, and detect the position of at least the control point T3 or the insertion portion PL21 based on the captured images.

Or, the combination of the first object and the second object may be any combination of two objects to be fitted in each other in place of the combination of the connector PL1 and the connector PL2.

As described above, the robot 20 (or the robot system 1) in the first embodiment and the second embodiment moves at least one of the first object and the second object in the direction in which the first object and the second object are closer to each other by the arm, and, if determining that the first object has come into contact with a position different from the insertion portion of the second object based on the output (in the examples, force detection information) of the force detect unit 21, separates the first object and the second object. Thereby, the robot 20 may suppress deformation of the first object and the second object when the first object comes into contact with a position different from the insertion portion of the second object.

Further, if determining that the first object has come into contact with a position different from the insertion portion of the second object, the robot 20 moves at least one of the first object and the second object in another direction than the opposite direction to the direction in which the first object and the second object are closer to each other of directions in which the first object and the second object are farther from each other, and separates the first object and the second object. Thereby, the robot 20 may move at least one of the first object and the second object from a different position in the direction in which the first object and the second object are closer to each other before and after the first object and the second object are separated.

Furthermore, if determining that the first object has come into contact with a position different from the insertion portion of the second object, the robot 20 separates the first object and the second object by setting a trajectory of the movement from a position different from the insertion portion of the second object to a straight line and moving at least the one of the first object and the second object in another direction than the opposite direction to the direction in which the first object and the second object are closer to each other of the directions in which the first object and the second object are farther from each other. Thereby, the robot 20 may shorten the period taken for moving at least one of the first object and the second object to a position to start moving the object in the direction in which the first object and the second object are closer to each other again after separating the first object and the second object.

When performing the contact of the first object to a position different from the insertion portion of the second object and the separation of the first object and the second object at twice or more, the robot 20 helically moves at least one of the first object and the second object as seen in a direction in which the first object and the second object are closer to each other. Thereby, the robot 20 may seek a position in which the first object can be inserted into the insertion portion of the second object while helically changing the relative position between the first object and the insertion portion of the second object to start moving the object in the direction in which the first object and the second object are closer to each other.

The robot 20 moves at least one of the electronic component and the second object in a direction in which the electronic component and the second object are closer to each other by the arm, and, if determining that the electronic component has come into contact with a position different from the insertion portion of the second object based on the output of a force detector, separates the electronic component and the second object. Thereby, the robot 20 may suppress deformation of the electronic component and the second object when the electronic component comes into contact with a position different from the insertion portion of the second object.

The robot 20 moves at least one of the first object and the second object in the direction in which the first object and the second object are closer to each other by teaching the reference position as a position of reference. Thereby, the robot 20 may move at least one of the first object and the second object in the direction in which the first object and the second object are closer to each other by teaching the reference position.

As above, the embodiments of the invention are described in detail with reference to the drawings. The specific configurations are not limited to the embodiments and changes, replacements, deletions, etc. may be made without departing from the scope of the invention.

A program for realizing a function of an arbitrary configuration part in the above described apparatus (e.g. the robot control apparatus 30) may be recorded in a computer-readable recording medium and the program may be read into a computer system and executed. Note that "computer system" here includes an OS (Operating System) and hardware such as a peripheral. Further, "computer-readable recording medium" refers to a portable medium such as a flexible disk, a magnetooptical disk, a ROM, a CD (Compact Disk)-ROM and a storage device such as a hard disk built in the computer system. Furthermore, "computer-readable recording medium" includes a medium that holds a program in a fixed period such as a volatile memory (RAM) within the computer system serving as a server or client when the program is transmitted via a network such as the Internet or a communication line such as a phone line.

The program may be transmitted from the computer system in which the program is stored in a memory device or the like via a transmission medium or transmission wave within the transmission medium to another computer system. Here, "transmission medium" for transmission of the program refers to a medium having a function of transmitting information including a network (communication network) such as the Internet and a communication line such as a phone line.

Further, the program may realize part of the above described function. Furthermore, the program may realize the above described function in combination with a program that has been already recorded in the computer system, the so-called differential file (differential program).

The entire disclosure of Japanese Patent Application No. 2015-231047, filed Nov. 26, 2015 is expressly incorporated by reference herein.

What is claimed is:

1. A robot comprising:
   an arm;
   an end effector attached to an end of the arm, the end effector configured to hold a first object;
   a force sensor provided in the arm and configured to detect a force applied to the first object;
   a memory configured to store computer-readable instructions and a target position of a second object relative to the arm holding the first object; and a processor configured to execute the computer-readable instructions so as to:

cause the arm holding the first object to move toward the second object in a first direction;

after the arm holding the first object moves in the first direction, cause the force sensor to detect when the first object held by the arm contacts a non-target positon of the second object that is different from the target position; and after the force sensor detects the contact of the first object at the non-target position of the second object, cause the arm holding the first object to linearly move in a second direction away from the second object, wherein the second direction is different from the first direction and an opposite direction of the first direction, wherein the second object has a plurality of the non-target positions, and when the processor is configured to repeatedly cause the arm holding the first object to move toward the second object, contact some positions of the plurality of the non-target positions, and move the arm holding the first object away from the second object, and the some positions are helically located on the second object in a plan view.

2. The robot according to claim 1, wherein the first object is an electronic component.

3. The robot according to claim 1, wherein the memory is configured to store a reference position, the processor is configured to calculate a positional relationship between the reference positon and each of the target position and the non-target position so as to control the movement of the first arm holding the first object.

* * * * *